United States Patent
Lee et al.

(10) Patent No.: US 9,900,920 B2
(45) Date of Patent: Feb. 20, 2018

(54) METHOD AND APPARATUS FOR CHANGING IN WIRELESS COMMUNICATION SYSTEM

(71) Applicant: LG ELECTRONICS INC., Seoul (KR)

(72) Inventors: Byungjoo Lee, Anyang-si (KR); Dongcheol Kim, Anang-si (KR); Jinho Kim, Anyang-si (KR); Wookbong Lee, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 14/759,175

(22) PCT Filed: Nov. 6, 2013

(86) PCT No.: PCT/KR2013/010001
§ 371 (c)(1),
(2) Date: Jul. 2, 2015

(87) PCT Pub. No.: WO2014/106990
PCT Pub. Date: Jul. 10, 2014

(65) Prior Publication Data
US 2015/0351146 A1    Dec. 3, 2015

Related U.S. Application Data

(60) Provisional application No. 61/748,449, filed on Jan. 3, 2013, provisional application No. 61/759,394, filed
(Continued)

(51) Int. Cl.
*H04W 76/02* (2009.01)
*H04W 8/00* (2009.01)
*H04W 84/12* (2009.01)

(52) U.S. Cl.
CPC ........ *H04W 76/023* (2013.01); *H04W 8/005* (2013.01); *H04W 84/12* (2013.01)

(58) Field of Classification Search
CPC .................................................. H04W 76/023
See application file for complete search history.

(56) References Cited

U.S. PATENT DOCUMENTS 8,041,825 B2 * 10/2011 Gibbs ................. H04L 41/0893
709/220
RE43,678 E * 9/2012 Major ..................... H01T 13/16
709/216
(Continued)

FOREIGN PATENT DOCUMENTS

JP    2013176045    9/2013
JP    2015531205    10/2015
(Continued)

OTHER PUBLICATIONS

PCT International Application No. PCT/KR2013/010001, Written Opinion of the International Searching Authority dated Mar. 31, 2014, 18 pages
(Continued)

*Primary Examiner* — Parth Patel
(74) *Attorney, Agent, or Firm* — Lee, Hong, Degerman, Kang & Waimey

(57) ABSTRACT

The present invention relates to a wireless communication system and, more particularly, to a method and apparatus for changing services in a direct communication system. A method for setting up a session in a first wireless device supporting a Wi-Fi direct service, according to one embodiment of the present invention, can include the steps of: setting up a connection between a first wireless device and a second wireless device, which includes a provision discovery process between the first wireless device and the second wireless device for creating a session for a first
(Continued)

service; and transmitting a request_session message from the first wireless device to the second wireless device for creating a session for a second service. Session information for the second service can be included in the request_session message.

12 Claims, 20 Drawing Sheets

Related U.S. Application Data on Jan. 31, 2013, provisional application No. 61/803,807, filed on Mar. 21, 2013, provisional application No. 61/804,198, filed on Mar. 22, 2013.

(56) References Cited

U.S. PATENT DOCUMENTS

| | | | | |
|---|---|---|---|---|
| 8,627,074 | B1* | 1/2014 | Goel | H04L 63/0428 380/255 |
| 8,705,550 | B2* | 4/2014 | Shah | G06F 9/54 370/421 |
| 8,706,124 | B2* | 4/2014 | Kakani | H04L 1/0022 455/179.1 |
| 8,738,442 | B1* | 5/2014 | Liu | G06Q 30/0267 705/14.4 |
| 9,609,676 | B1* | 3/2017 | Bijwe | H04W 8/005 |
| 2003/0135629 | A1* | 7/2003 | Sasaki | G06Q 30/02 709/229 |
| 2008/0026692 | A1* | 1/2008 | Kojima | H04B 7/155 455/7 |
| 2008/0311899 | A1* | 12/2008 | Moriwaki | H04L 29/12122 455/422.1 |
| 2009/0016255 | A1* | 1/2009 | Park | H04W 8/005 370/312 |
| 2009/0061839 | A1* | 3/2009 | Zimmerman | H04W 8/22 455/419 |
| 2009/0216846 | A1* | 8/2009 | Burroughs | H04W 4/02 709/206 |
| 2009/0217329 | A1* | 8/2009 | Riedl | H04N 7/17318 725/93 |
| 2010/0157960 | A1* | 6/2010 | Banerjee | H04L 67/1095 370/338 |
| 2011/0082939 | A1* | 4/2011 | Montemurro | H04W 76/023 709/227 |
| 2011/0082940 | A1* | 4/2011 | Montemurro | H04L 69/24 709/227 |
| 2011/0149806 | A1 | 6/2011 | Verma et al. | |
| 2011/0263290 | A1* | 10/2011 | Nam | H04W 52/0225 455/552.1 |
| 2011/0281556 | A1* | 11/2011 | Choi | H04M 1/72583 455/411 |
| 2012/0011247 | A1* | 1/2012 | Mallik | H04W 8/005 709/224 |
| 2012/0084388 | A1* | 4/2012 | De Foy | H04L 65/1096 709/217 |
| 2012/0102073 | A1* | 4/2012 | Patel | H04L 12/5815 707/803 |
| 2012/0179789 | A1* | 7/2012 | Griot | H04W 12/08 709/220 |
| 2012/0243524 | A1* | 9/2012 | Verma | H04W 48/16 370/338 |
| 2012/0265913 | A1* | 10/2012 | Suumaki | H04W 4/008 710/303 |
| 2013/0185447 | A1* | 7/2013 | Nagawade | H04W 8/005 709/228 |
| 2013/0227152 | A1 | 8/2013 | Lee et al. | |
| 2013/0288668 | A1* | 10/2013 | Pragada | H04W 12/06 455/426.1 |
| 2014/0016507 | A1* | 1/2014 | Han | H04W 28/18 370/254 |
| 2014/0071870 | A1* | 3/2014 | Abraham | H04W 52/0206 370/311 |
| 2014/0120829 | A1* | 5/2014 | Bhamidipati | H04N 21/42207 455/3.06 |
| 2014/0148165 | A1* | 5/2014 | Serravalle | H04W 16/14 455/436 |
| 2014/0160938 | A1* | 6/2014 | Qu | H04W 8/065 370/236 |
| 2014/0171034 | A1* | 6/2014 | Aleksin | G06Q 30/016 455/414.1 |
| 2015/0127733 | A1* | 5/2015 | Ding | H04W 4/08 709/204 |

FOREIGN PATENT DOCUMENTS

| | | |
|---|---|---|
| KR | 10-0960835 | 6/2010 |
| KR | 10-2011-0125695 | 11/2011 |
| KR | 10-2012-0103567 | 9/2012 |
| WO | 2012/060611 | 5/2012 |
| WO | 2012/150815 | 11/2012 |
| WO | 2012/173423 | 12/2012 |

OTHER PUBLICATIONS

European Patent Office Application Serial No. 13870338.4, Search Report dated Jan. 4, 2016, 7 pages

* cited by examiner (a)

"A" invited "B"

(b)

● Group Owner  ◎ Group Client  ⊖ Not in group (a)

"A" associated with "B"

(b)

(a)

"A" associated with "B"

(b)

"A" associated with "B"

(b)

◯ Group Owner   ◯ Group Client   —×— Link termination

METHOD AND APPARATUS FOR CHANGING IN WIRELESS COMMUNICATION SYSTEM

CROSS-REFERENCE TO RELATED APPLICATIONS

This application is the National Stage filing under 35 U.S.C. 371 of International Application No. PCT/KR2013/010001, filed on Nov. 6, 2013, which claims the benefit of U.S. Provisional Application No. 61/748,449, filed on Jan. 3, 2013, 61/759,394, filed on Jan. 31, 2013, 61/803,807, filed on Mar. 21, 2013 and 61/804,198, filed on Mar. 22, 2013, the contents of which are all hereby incorporated by reference herein in their entirety.

TECHNICAL FIELD

Following description relates to a wireless communication system, and more particularly, to a method of switching a service in a wireless communication system and an apparatus therefor.

BACKGROUND ART

Recently, with the development of information communication technology, various wireless communication technologies have been developed. Of the technologies, wireless LAN (WLAN) is the technology that allows home or company or a specific service zone to access Internet wirelessly by using a portable terminal such as a personal digital assistant (PDA), a lap top computer, a portable multimedia player (PMP).

As direct communication technology that may allow devices to be easily connected with each other without a radio access point (AP) basically required in a conventional WLAN system, the introduction of Wi-Fi Direct or Wi-Fi peer-to-peer (P2P) has been discussed. According to Wi-Fi Direct, devices may be connected to each other even without a complicated establishment procedure. Also, Wi-Fi Direct may support a mutual operation for data transmission and reception at a communication speed of a general WLAN system to provide users with various services.

Recently, various Wi-Fi support devices have been used. Of the Wi-Fi support devices, the number of Wi-Fi Direct support devices that enable communication between Wi-Fi devices without AP has been increased. In Wi-Fi Alliance (WFA), technology for the introduction of a platform for supporting various services (for example, Send, Play, Display, Print, etc.) using Wi-Fi Direct link has been discussed. This may be referred to as Wi-Fi Direct Service (WFDS). According to the WFDS, applications, services, etc. may be controlled or managed by a service platform called an application service platform (ASP).

DISCLOSURE OF THE INVENTION

Technical Tasks

According to a related art of WFDS, a method of performing a service between devices supporting the WFDS is prepared. Yet, when there exist a plurality available services between the devices supporting the WFDS, a method of switching a service from one service to another service while a prescribed service is using is not defined yet.

One object of the present invention is to provide a method of seamlessly switching a service and a method of returning to an original service in a WFDS system. Specifically, one object of the present invention is to provide a method for a WFDS device to control or manage an ASP to seamlessly switch a service.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of setting up a session in a first wireless device supporting a Wi-Fi Direct service can include the steps of setting up a connection between the first wireless device and a second wireless device including a provision discovery process between the first wireless device and the second wireless device to create a session for a first service and transmitting a session request (REQUEST_SESSION) message to the second wireless device from the first wireless device to create a session for a second service. In this case, session information on the second service can be included in the session request message.

To further achieve these and other advantages and in accordance with the purpose of the present invention, according to a different embodiment, a method of setting up a session in a second wireless device supporting a Wi-Fi Direct service can include the steps of setting up a connection between a first wireless device and the second wireless device including a provision discovery process between the first wireless device and the second wireless device to create a session for a first service and receiving a session request (REQUEST_SESSION) message from the first wireless device in the second wireless device to create a session for a second service. In this case, session information on the second service can be included in the session request message.

To further achieve these and other advantages and in accordance with the purpose of the present invention, according to a further different embodiment, a first wireless device supporting a Wi-Fi Direct service and performing session setup can include a transceiver and a processor, the processor configured to setup a connection between the first wireless device and a second wireless device including a provision discovery process between the first wireless device and the second wireless device to create a session for a first service, the processor configured to control the transceiver to transmit a session request (REQUEST_SESSION) message to the second wireless device from the first wireless device to create a session for a second service. In this case, session information on the second service can be included in the session request message.

To further achieve these and other advantages and in accordance with the purpose of the present invention, according to a further different embodiment, a second wireless device supporting a Wi-Fi Direct service and performing session setup can include a transceiver and a processor, the processor configured to setup a connection between a first wireless device and the second wireless device including a provision discovery process between the first wireless device and the second wireless device to create a session for a first service, the processor configured to control the transceiver to receive a session request (REQUEST_SESSION) message from the first wireless device in the second wireless device to create a session for a second service. In this case, session information on the second service can be included in the session request message.

Following items can be commonly applied to embodiments according to the present invention.

If the first wireless device has a connection with the second wireless device, a provision discovery process can be omitted from a process of creating a session for the second service.

Session information on the first service can be included in a provision discovery request message.

At least one of a device discovery process and a service discovery process can be performed before the connection is setup.

A device discovery process can include a probe request frame transmitted to the second wireless device from the first wireless device and a probe response frame received from the second wireless device by the first wireless device. At least one of the probe request frame and the probe response frame can include at least one of a plurality of service names or a plurality of service hash values for the first service and the second service.

The step of setting up the connection can further include a P2P group formation process.

If an ASP (application service platform) of the first wireless device receives a ConnectSession method from a service layer of the first wireless device, the ASP creates a new ASP-session as a service seeker and can change to an Initiate state.

If a session addition (ADDED_SESSION) message is received from the second wireless device in response to the session request (REQUEST_SESSION) message, the ASP of the first wireless device can change to an Open state from the Initiate state.

If a connection exists between the first wireless device and the second wireless device, the ASP of the first wireless device can be changed to a GroupFormationComplete state. Or, if a connection does not exist between the first wireless device and the second wireless device, the ASP of the first wireless device can be changed to a ServiceRequestSent state.

If a session rejection (REJECTED_SESSION) message is received from the second wireless device in response to the session request (REQUESTED_SESSION) message, the ASP of the first wireless device can change to a Closed state from the Initiate state.

If the session for the second service is created, a port assigned to the session for the first service can be released.

The first service may correspond to one of services configured to support a Send, a Play, a Display, a Print and a third party application. The second service may correspond to a different service except the first service.

The first wireless device may correspond to a service seeker and the second wireless device may correspond to a service advertiser.

The connection between the first wireless device and the second wireless device may correspond to a P2P (peer-to-peer) connection or an IP (internet protocol) connection.

If an ASP of the second wireless device receives the session request (REQUEST_SESSION) message from the first wireless device, the ASP creates a new ASP-session as a service advertiser and can change to a Requested state.

When a connection exists between the first wireless device and the second wireless device, if an ASP of the second wireless device receives the session request (REQUEST_SESSION) message from the first wireless device, the ASP of the second wireless device can inform a user of the second wireless device or an application of the second wireless device of reception of the session request message. And, information indicating acceptance or rejection of the session request can be received from the user or the application.

If an ASP of the second wireless device receives the session request (REQUEST_SESSION) message from the first wireless device, the ASP of the second wireless device can be changed to a ServiceRequestReceived state. In this case, if a connection exists between the first wireless device and the second wireless device, the ASP of the second wireless device can be changed from the ServiceRequestReceived state to an Open state. Or, if the connection does not exist between the first wireless device and the second wireless device, the ASP of the second wireless device can be changed from the ServiceRequestReceived state to a GroupFormationStarted state.

It is to be understood that both the foregoing general description and the following detailed description are exemplary and explanatory and are intended to provide further explanation of the invention as claimed.

Advantageous Effects

According to the present invention, it is able to provide a method of seamlessly switching a service and a method of returning to an original service in a WFDS system and an apparatus therefor. Specifically, according to the present invention, it is able to provide a method for a WFDS device to control or manage an ASP to seamlessly switch a service and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention may be non-limited.

Structure of WLAN System

Figure 1:
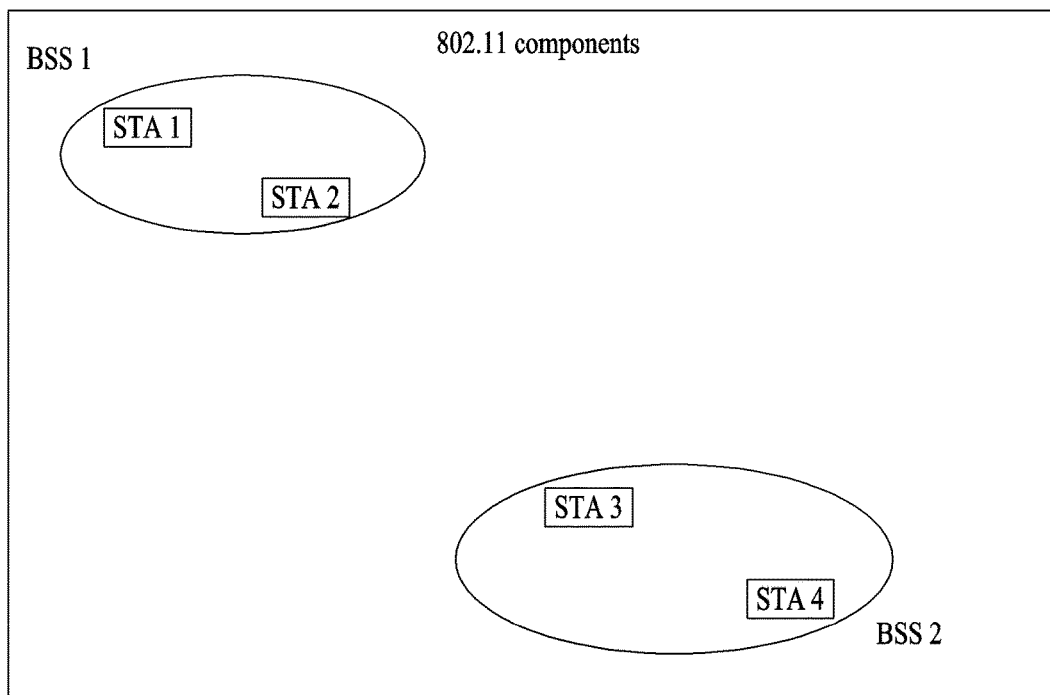
FIG. 1 is a diagram illustrating an exemplary structure of an IEEE 802.11 system.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Additionally, FIG. 1 shows such a configuration element as a DS (distribution system), a DSM (distribution system medium), an AP (access point) and the like.

In WLAN, a direct station-to-station distance can be restricted by PHY capability. In some cases, the restriction of the distance may be sufficient enough. Yet, in some cases, it may be necessary to perform communication between stations of longer distance. In order to support extended coverage, it may be able to configure a DS (distribution system).

A DS indicates a structure of BSSs interconnected with each other. Specifically, as shown in FIG. 1, a BSS may exist as a configuration element of an extended form of a network consisting of a plurality of BSSs instead of an independently existing BSS.

A DS corresponds to a logical concept and can be specified by a characteristic of a DSM (distribution system medium). Regarding this, IEEE 802.11 standard logically distinguishes a WM (wireless medium) from the DSM (distribution system medium). Each logical medium is used for a purpose different from each other and is used by a configuration element different from each other. Definition of the IEEE 802.11 standard does not restrict the media to be identical to each other and does not restrict the media to be different from each other. Since a plurality of the media are logically different from each other, it may be able to explain as IEEE 802.11 WLAN structure (a DS structure or a different network structure) is flexible. In particular, the IEEE 802.11 WLAN structure can be implemented in various ways and the WLAN structure can be independently specified by a physical characteristic of each implementation case.

A DS provides seamless integration of a plurality of BSSs and logical services necessary for handling an address to a destination to support a mobile device.

An AP enables associated STAs to access a DS via a WM. The AP corresponds to an entity having STA functionality. Data can move between a BSS and a DS via the AP. For instance, as shown in FIG. 1, while an STA 2 and an STA 3 have STA functionality, the STA 2 and the STA 3 provide a function for enabling associated STAs (STA 1 and STA 4) to access the DS. And, since all APs basically correspond to an STA, all APs correspond to an addressable entity. It is not mandatory that an address used by the AP for communication in WM is identical to an address used by the AP for communication in DSM.

Data transmitted from one of STAs associated with an AP to an STA address of the AP is always received in an uncontrolled port and the data can be processed by IEEE 802.1X port access entity. If a controlled port is authenticated, a transmission data (or a frame) can be delivered to a DS.

Layer Structure

The operation of the STA which is operated in the wireless LAN system may be described in view of layer structure. In aspect of device configuration, layer structure may be implemented by a processor. The STA may have a structure of a plurality of layers. For example, a layer structure handled by the 802.11 standard document mainly includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptionally include management entities called MAC sublayer management entity (MLME) and physical layer management entity (PLME), respectively. These entities provide a layer management service interface that operates a layer management function.

In order to provide exact MAC operation, an SME (Station Management Entity) is present within each STA. The SME is a layer independent entity that may be viewed as residing in a separate management plane or as residing "off to the side." The exact functions of the SME are not specified in this document, but in general this entity may be viewed as being responsible for such functions as the gathering of layer-dependent status from the various layer management entities (LMEs), and similarly setting the value of layer-specific parameters. The SME may perform such functions on behalf of general system management entities and may implement standard management protocols.

The aforementioned entities interact in various ways. For example, the entities may interact by exchanging GET/SET primitives. The primitive means a set of elements or parameters related to a specific object. XX-GET.request primitive is used for requesting the value of the given MIB attribute (management information base attribute). XX-GET.confirm primitive is used for returning the appropriate MIB attribute value if status is "success," otherwise returning an error indication in the Status field. XX-SET.request primitive is used for requesting that the indicated MIB attribute be set to the given value. If this MIB attribute implies a specific action, this requests that the action be performed. And, XX-SET.confirm primitive is used such that, if status is "success," this confirms that the indicated MIB attribute has been set to the requested value, otherwise it returns an error condition in the status field. If this MIB attribute implies a specific action, this confirms that the action has been performed.

Also, the MLME and the SME may exchange various MLME_GET/SET primitives through MLME_SAP (Service Access Point). Also, various PLME_GET/SET primitives may be exchanged between PLME and SME through PLME_SAP, and may be exchanged between the MLME and PLME through MLME-PLME_SAP.

Evolution of Wireless LAN

Standards for Wireless Local Area Network (WLAN) technology have been developed by Institute of Electrical and Electronics Engineers (IEEE) 802.11 group. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transmission rate of 300 Mbps. IEEE 802.11n may support a channel bandwidth up to 40 MHz to provide a transmission rate of 600 Mbps.

A direct link setup (DLS) related protocol under the environment according to IEEE 802.11e is based on QBSS (Quality BSS (basic service set)) that BSS supports QoS (Quality of Service). In QBSS, AP as well as non-AP STA is a QAP (Quality AP) that supports QoS. However, under the WLAN environment (for example, WLAN environment according to IEEE 802.11a/b/g) which is currently commercialized, although the non-AP STA is a QSTA (Quality STA) that supports QoS, the AP is likely to be a legacy AP that fails to support QoS. As a result, there is a limitation that DLS service cannot be used even in case of the QSTA under the WLAN environment which is currently commercialized.

Tunneled direct link setup (TDLS) is a wireless communication protocol which is newly suggested to solve such a limitation. TDLS, although not supporting QoS, enables QSTAs to set a direct link even under the WLAN environment such as IEEE 802.11a/b/g which is currently commercialized and set a direct link even in case of a power save mode (PSM). Accordingly, TDLS prescribes all the procedures for enabling QSTAs to set a direct link even at BSS managed by the legacy AP. Hereinafter, a wireless network that supports TDLS will be referred to as a TDLS wireless network.

Wi-Fi Direct Network

The WLAN according to the related art has mainly handled the operation of an infrastructure BSS that a radio access point (AP) functions as a hub. The AP performs a physical layer support function for wireless/wire connection, a routing function for devices on the network, and service provision for adding/removing a device to/from the network. In this case, devices within the network are not directly connected with each other but connected with each other through the AP.

As technology for supporting direct connection between devices, enactment of Wi-Fi Direct standard has been discussed.

Figure 2:
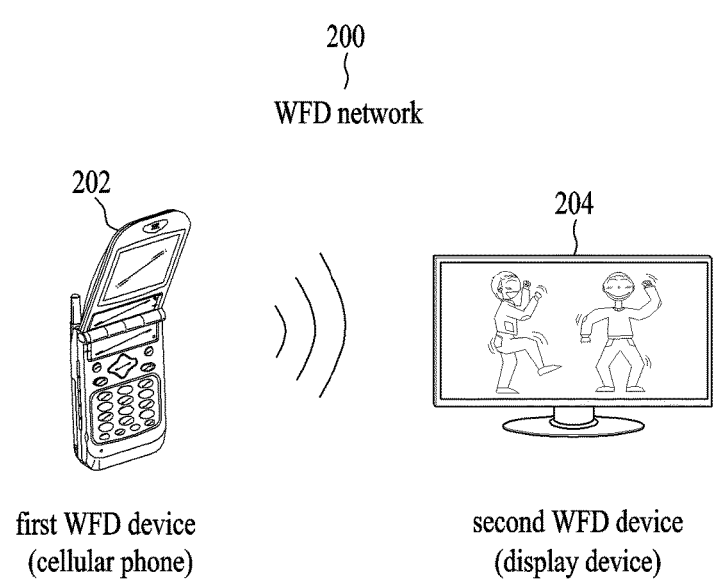
FIG. 2 is a diagram illustrating a WFD (Wi-Fi Direct) network.

FIG. 2 is a diagram illustrating a Wi-Fi Direct network. The Wi-Fi Direct network is a network that enables Wi-Fi devices to perform device-to-device (D2D) (or peer-to-peer (P2P)) communication even without association with a home network, office network and hot spot network, and has been suggested by Wi-Fi Alliance. Hereinafter, Wi-Fi Direct based communication will be referred to as WFD D2D communication (simply D2D communication) or WFD P2P communication (simply, P2P communication). Also, a device that performs WFD P2P will be referred to as WFD P2P device, simply referred to as P2P device.

Referring to FIG. 2, the WFD network 200 may include at least one Wi-Fi device that includes a first WFD device 202 and a second WFD device 204. The WFD device may include Wi-Fi supporting devices, for example, a display device, a printer, a digital camera, a projector, a smart phone, etc. In addition, the WFD device may include a non-AP STA and an AP STA. In this example, the first WFD device 202 is a smart phone, and the second WFD device 204 is a display device. The WFD devices of the WFD network may directly be interconnected. In more detail, P2P communication may mean that a signal transmission path between two WFD devices is directly configured in the corresponding WFD devices without passing through a third device (e.g., AP) or a legacy network (e.g., a network accessed to WLAN through an AP). In this case, a signal transmission path directly configured between two WFD devices may be limited to a data transmission path. For example, P2P communication may mean that a plurality of non-STAs transmit data (e.g., voice, image, text information, etc.) without passing through the AP. A signal transmission path for control information (e.g., resource allocation information for P2P configuration, wireless device identification information, etc.) may directly be configured between WFD devices (e.g., non-AP STA to non-AP STA, non-AP STA to AP), may be configured between two WFD devices (e.g., non-AP to non-AP STA) through the AP, or may be configured between the AP and the corresponding WFD device (e.g., AP to non-AP STA #1, AP to non-AP STA #2).

Figure 3:
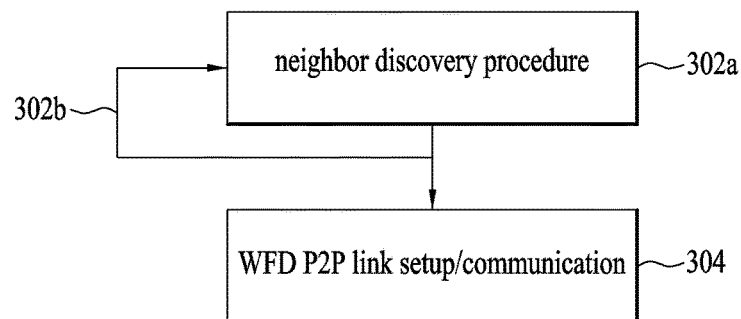
FIG. 3 is a diagram illustrating a procedure of configuring a WFD network.

FIG. 3 is a diagram illustrating a method for configuring a WFD network.

Referring to FIG. 3, the WFD network setup procedure may be largely classified into two procedures. The first procedure is a neighbor discovery (ND) procedure (S302a), and the second procedure is a P2P link configuration and communication procedure (S304). Through the neighbor discovery procedure, the WFD device (e.g., 202 of FIG. 2) searches for another neighbor WFD device (e.g., 204 of FIG. 2) within (its own radio) coverage, and may obtain information required for association (e.g., pre-association) with the corresponding WFD device. In this case, the pre-association may mean a second layer pre-association in a radio protocol. For example, information required for the pre-association may include identification information of the neighbor WFD device. The neighbor discovery procedure may be carried out per available radio channel (S302b). Afterwards, the WFD device 202 may perform WFD P2P link configuration/communication with another WFD device 204. For example, after the WFD device 202 is associated with a peripheral WFD device 204, the WFD device 202 may determine whether the corresponding WFD device 204 is a WFD device incapable of satisfying service requirements of a user. To this end, after the WFD device 202 is second layer pre-associated with the peripheral WFD device 204, the WFD device 202 may search for the corresponding WFD device 204. If the corresponding WFD device 204 does not satisfy service requirements of the user, the WFD device 202 may sever the second layer association configured for the corresponding WFD device 204, and may configure the second layer association with another WFD device. By contrast, if the corresponding WFD device 204 satisfies the service requirements of the user, the two WFD devices 202 and 204 may transmit and receive signals through a P2P link.

Figure 4:
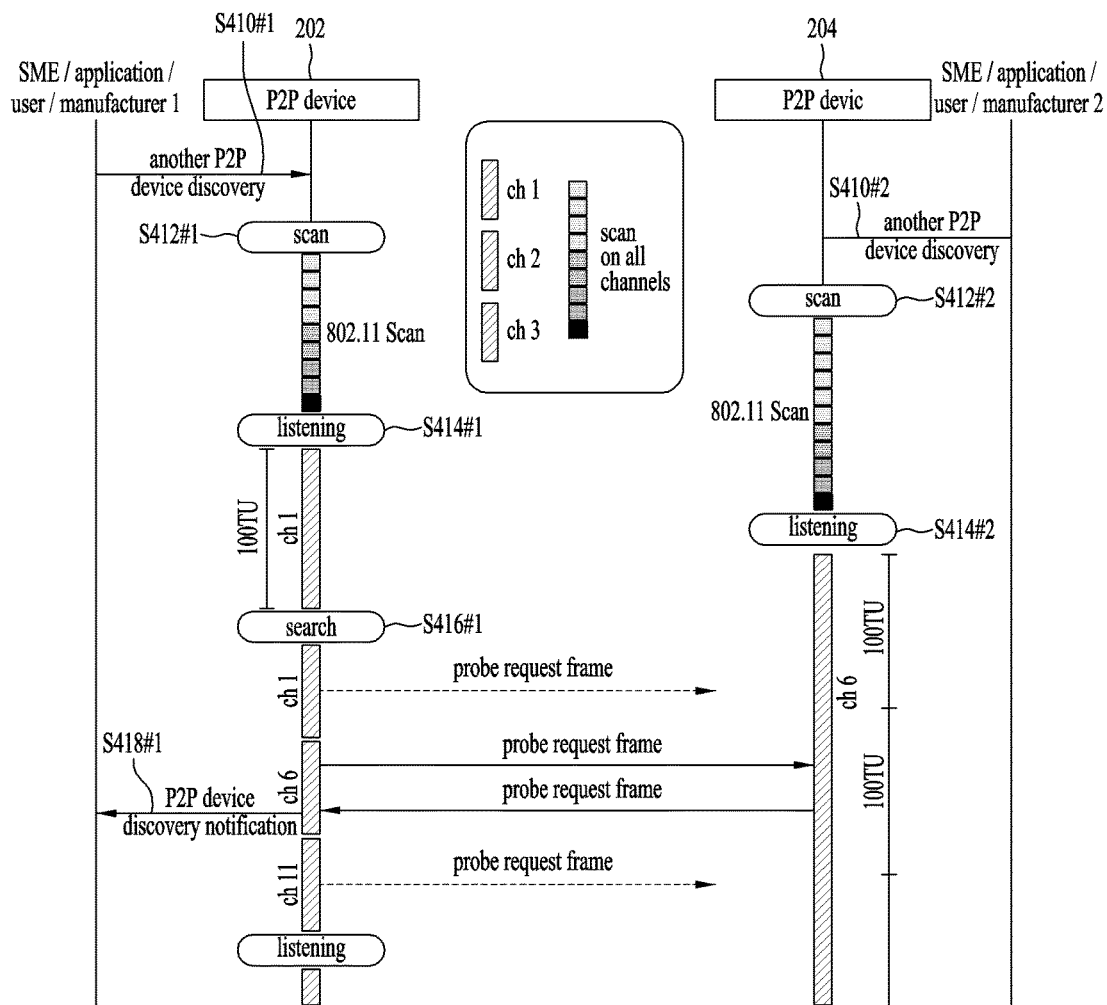
FIG. 4 is a diagram illustrating a neighboring discovery procedure.

FIG. 4 is a diagram illustrating a neighboring discovery procedure. The example of FIG. 4 may be understood as an operation between the WFD device 202 and the WFD device 204 shown in FIG. 3.

Referring to FIG. 4, the neighbor discovery procedure of FIG. 3 may be initiated by indication of station management entity (SME)/application/user/vendor (S410), and may be classified into a scanning step S412 and finding steps S414 to S416. The scanning step S412 may include the operation for scanning all available RF channels according to 802.11 schemes. Through the above-mentioned operation, the P2P device may confirm the best operation channel. The finding steps S414 to S416 may include a listening mode S414 and a search mode S416. The P2P device may alternately repeat the listening mode S414 and the search mode S416. The P2P devices 202 and 204 may perform active search by using a probe request frame in the search mode S416. For rapid search, the search range may be limited to social channels denoted by Channels #1, #6, #11 (2412, 2437, 2462 MHz). In addition, the P2P devices 202 and 204 may select only one channel from three social channels in the listening mode S414, and maintain a reception status. In this case, if the other P2P device (e.g., 202) receives the probe request frame transmitted in the search mode, the P2P device (e.g., 204) generates a probe response frame in response to the received probe request frame. A time of the listening mode S414 may be given at random (e.g., 100, 200, 300 time unit (TU)). The P2P devices continuously repeat the search mode and the reception mode so that they may reach a common channel. After the P2P device discovers another P2P device, the P2P device may discover/exchange a device type, a manufacturer, or a familiar device name by using the probe request frame and the probe response frame such that the P2P device may selectively be coupled to the corresponding P2P device. If the P2P device discovers the peripheral P2P device and obtains necessary information through the neighbor discovery procedure, the P2P device (e.g., 202) may notify SME/application/user/vendor of the P2P device discovery (S418).

Presently, P2P may be mainly used for semi-static communication such as remote printing, photo sharing, etc. However, due to generalization of Wi-Fi devices and location based services, P2P availability is gradually increased. For example, it is expected that the P2P device will actively be used for social chatting (for example, wireless devices subscribed to Social Network Service (SNS) recognize radio devices located in a neighboring region on the basis of the location based service and transmit and receive information), location-based advertisement provision, location-based news broadcasting, and game interaction between wireless devices. For convenience of description, such P2P application will hereinafter be referred to as new P2P application.

Figure 5:
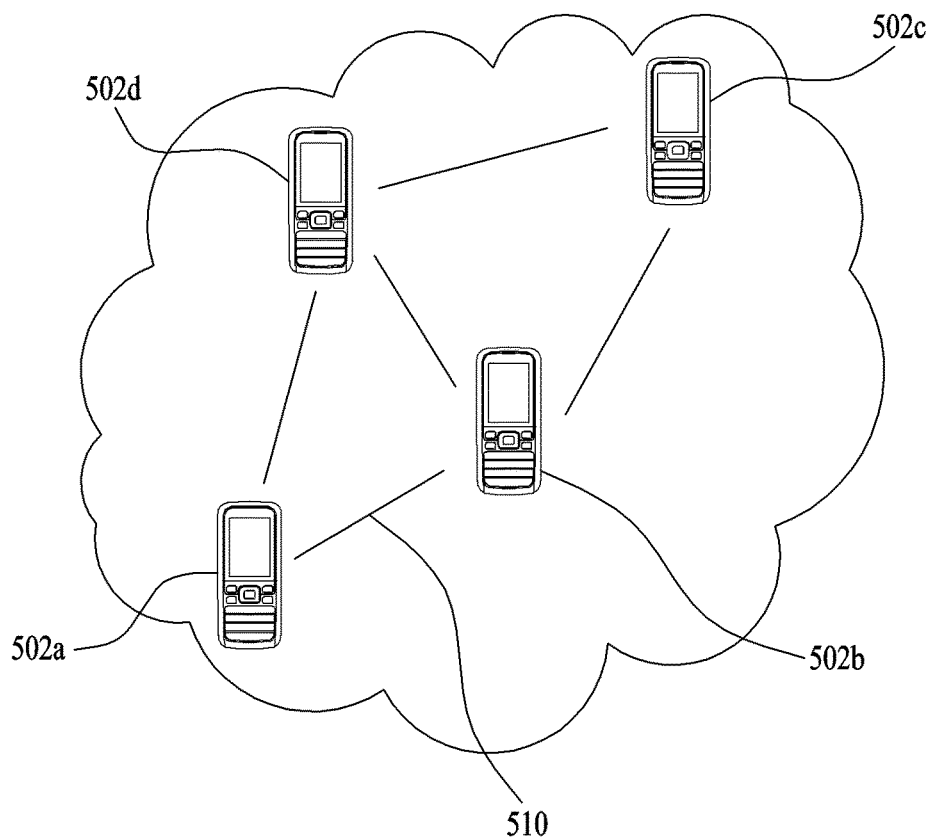
FIG. 5 is a diagram illustrating new aspect of a WFD network.

FIG. 5 is a diagram illustrating new aspect of a WFD network.

The example of FIG. 5 may be understood as WFD network aspect for use in the case in which new P2P application (e.g., social chatting, location-based service provision, game interaction, etc.) is applied.

Referring to FIG. 5, a plurality of P2P devices 502a to 502d performs P2P communication 510 in the WFD network, P2P device(s) constituting the WFD network may be changed at any time due to movement of the P2P device(s), and a new WFD network may be dynamically generated or deleted within a short time. As described above, characteristics of the new P2P application indicate that P2P communication may dynamically be performed and terminated within a short time among a plurality of P2P devices in the dense network environment.

Figure 6:
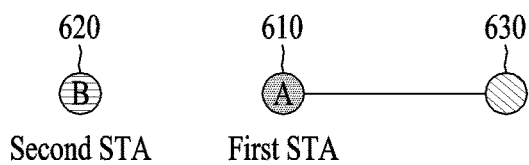
FIG. 6 is a diagram illustrating a method for setup of a link for WFD communication.
Figure 6:
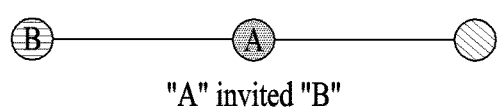

FIG. 6 is a diagram illustrating a method for setup of a link for WFD communication.

As shown in FIG. 6a, a first STA 610 (hereinafter, referred to as "A") is being operated as a group owner during conventional WFD communication. If the A 610 discovers a second STA 620 (hereinafter, referred to as "B"), which is a new WFD communication target and does not perform WFD communication, during communication with a group client 630 of conventional WFD communication, the A 610 tries link setup with the B 620. In this case, new WFD communication is WFD communication between the A 610 and the B 620, and since the A is a group owner, the A may perform communication setup separately from communication of the conventional group client 630. Since one WFD group may include one group owner and one or more group clients, as shown in FIG. 6b, a WFD link may be set as the A 610 which is one group owner is satisfied. In this case, the A 610 invites the B 620 to the conventional WFD communication group, and in view of WFD communication characteristic, WFD communication between the A 610 and the B 620 and between the A 610 and the conventional group client 630 may be performed but WFD communication between the B 620 and the conventional group client 630 is may not be supported. If an intra-BSS option is activated (or, set to 'on') among P2P capability of Wi-Fi Direct, WFD direct communication (i.e., direct communication between clients in Wi-Fi Direct BSS) between the B 620 and the conventional group client 630 may be supported.

Figure 7:
FIG. 7 is a diagram illustrating a method for association with a communication group that performs WFD.
Figure 7:
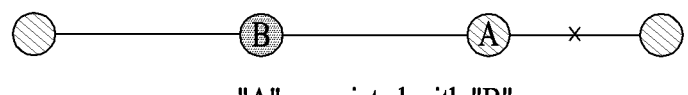

FIG. 7 is a diagram illustrating a method for association with a communication group that performs WFD, As shown in FIG. 7a, a first STA 710 (hereinafter, referred to as "A") is performing communication as a group owner for a group client 730, and a second STA 720 (hereinafter, referred to as "B") is performing communication as a group owner for a group client 740. As shown in FIG. 7b, the A 710 may terminate conventional WFD communication and may perform association with a WFD communication group to which the B 720 belongs. Since the A 710 is a group owner, the A 710 becomes a group client. Preferably, the A 710 terminates the conventional WFD communication before requesting association with the B 720.

Figure 8:
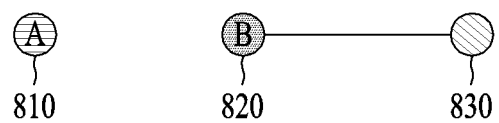
FIG. 8 is a diagram illustrating a method for setup of a link for WFD communication.
Figure 8:
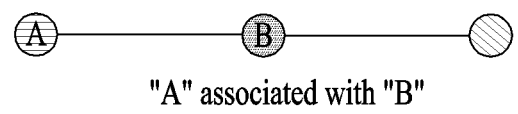

FIG. 8 is a diagram illustrating a method for configuring a link for WFD communication.

As shown in FIG. 8a, a second STA 820 (hereinafter, referred to as "B") is being operated as a group owner during conventional WFD communication. If the B 820 is performing conventional WFD communication with a group client 830, a first STA 810 (hereinafter, referred to as "A"), which does not perform the WFD communication, discovers the B 820 and tries link setup for new WFD communication with the B 820. In this case, if the B 820 accepts link setup, a new WFD communication link between the A 810 and the B 820 is set, and the A 810 is operated as a client of conventional WFD group of the B 820. This case corresponds to the case where the A 810 performs association with the WFD communication group of the B 820. The A 810 may only perform WFD communication with the B 820 which is a group owner, and WFD communication between the A 810 and the client 830 of the conventional WFD communication is may not be supported. If an intra-BSS option is activated (or, set to 'on') among P2P capability of Wi-Fi Direct, WFD direct communication (i.e., direct communication between clients in Wi-Fi Direct BSS) between the A 810 and the client 830 of the conventional WFD communication may be supported.

Figure 9:
FIG. 9 is a diagram illustrating a method for setup of a link that is associated with a WFD communication group.
Figure 9:
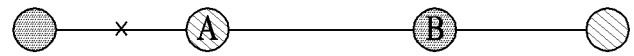

FIG. 9 is a diagram illustrating a method for configuring a link that is associated with a WFD communication group.

As shown in FIG. 9a, a first STA 910 (hereinafter, referred to as "A") is performing WFD communication as a group client for a group owner 930. At this time, the A 910 discovers a second STA 920 (hereinafter, referred to as "B"), which is performing communication as a group owner for a group client 940 of another WFD communication, and terminates a link with the group owner 930. And, the A 910 may perform association with WFD of the B 920.

Wi-Fi Direct Service (WFDS)

A Wi-Fi Direct corresponds to a network connection standard technology configured to define operation of a link layer. Since a standard for an application operating in a higher layer of a link configured by the Wi-Fi Direct is not defined yet, if the application is executed after devices supporting the Wi-Fi Direct are connected with each other, it is difficult to support compatibility. In order to solve the aforementioned problem, standardization on operation of such a higher layer application as a Wi-Fi Direct service (WFDS) is discussing by WFA (Wi-Fi Alliance).

Figure 10:
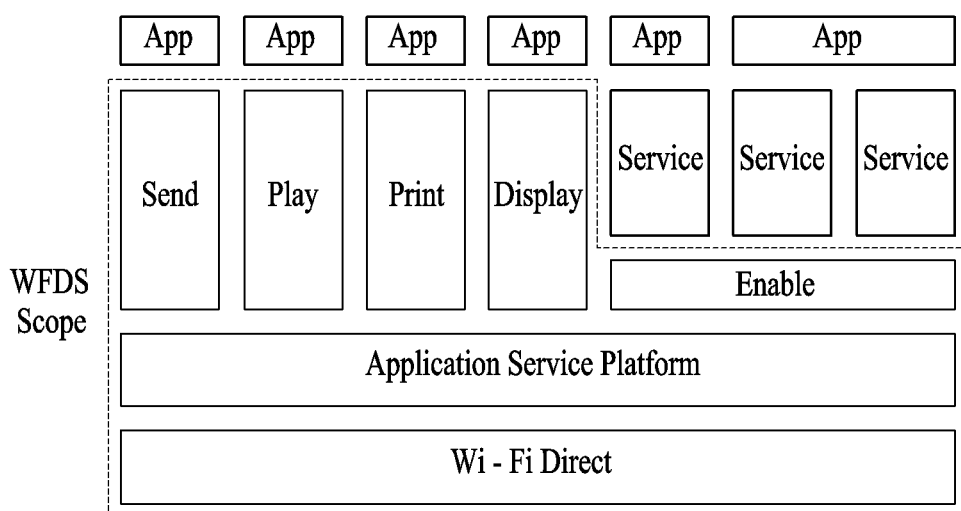
FIG. 10 is a diagram illustrating WFDS framework components.

FIG. 10 is a diagram illustrating WFDS framework components.

A Wi-Fi Direct layer shown in FIG. 10 indicates a MAC layer defined by Wi-Fi Direct standard. The Wi-Fi Direct layer can be configured by software compatible with the Wi-Fi Direct standard. A wireless connection can be configured by a physical layer (not depicted) compatible with Wi-Fi PHY at the lower part of the Wi-Fi Direct layer. Such a platform as an ASP (application service platform) is defined at the top of the Wi-Fi Direct layer.

The ASP corresponds to a common shared platform and the ASP performs session management, command processing of a service, controlling between ASPs and security function between an application layer situating at the top of the ASP and the Wi-Fi Direct layer situating at the bottom of the ASP.

A service layer is defined at the top of the ASP. The service layer includes use-specific services. The WFA defines 4 basic services including a Send service, a Play service, a Display service and a Print service. And, an Enable API (application program interface) is defined to make an ASP common platform usable when a $3^{rd}$ party application is supported as well as a basic service.

Although FIG. 10 shows the Send service, the Play service, the Display service, the Print service, the service defined by the $3^{rd}$ party application and the like as an example of a service, by which the present invention may be non-limited. For instance, such a terminology as "service" in the present document may correspond to one of services supporting a WSB (Wi-Fi serial bus), Wi-Fi docking, and a NAN (neighbor awareness networking) as well as the Send service, the Play service, the Display service, the Print service, and the service defined by the $3^{rd}$ party application.

The Send service may correspond to a service capable of performing file transfer between two WFDS devices and an application. The Play service may correspond to a service capable of sharing or streaming audio/video (A/V), picture, music and the like based on DLNA (digital living network alliance) between two WFDS devices and an application. The Print service may correspond to a service capable of outputting a document, a picture and the like between a device including contents such as a document, a picture and the like and a printer and an application. The Display service may correspond to a service capable of sharing a screen with each other between a Miracast source of the WFA and Sync and an application.

An application layer can provide a user interface (UI) and performs such a function as representing information in a form recognizable by a person, delivering an input of a user to a lower layer and the like.

Figure 11:
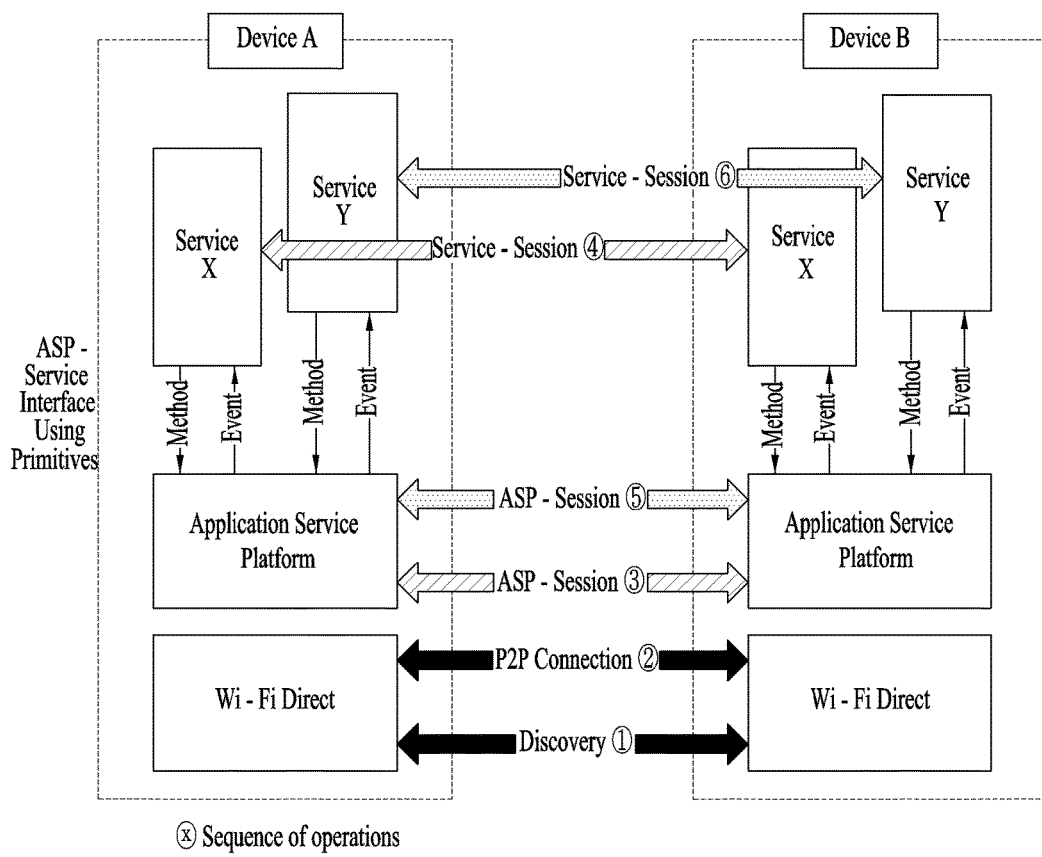
FIG. 11 is a diagram illustrating WFDS operation.

FIG. 11 is a diagram illustrating WFDS operation.

In FIG. 11, assume that there exist two peer devices including a device A and a device B.

An ASP corresponds to a logical entity configured to implement common functions required by services. The functions can include device discovery, service discovery, ASP-session management, connection topology management, security and the like.

An ASP-session corresponds to a logical link between an ASP of the device A and an ASP of the device B. In order to start the ASP-session, it is necessary to establish a P2P (peer-to-peer) connection between the peer devices. An ASP can setup a plurality of ASP-sessions between two devices. Each of a plurality of the ASP-sessions can be identified by a session identifier assigned by an ASP requiring an ASP-session.

A service corresponds to a logical entity providing use-specific functions to different services or an application using an ASP. A service of a device can communicate with a corresponding service of one or more different services using a service-specific protocol (the service-specific protocol can be defined by a service standard and an ASP protocol).

An interface between an ASP and a service is defined by a method and an event. The method indicates an operation initiated by the service and a parameter (or a field) of the method can include information on an operation to be performed. The event provides information from the ASP to the service.

If a user intends to use a service X between the device A and the device B, the ASP of each device generates a service X-dedicated ASP-session between the devices. Subsequently, if the user intends to use a service Y, a new ASP-session for the service Y is established.

Figure 12:
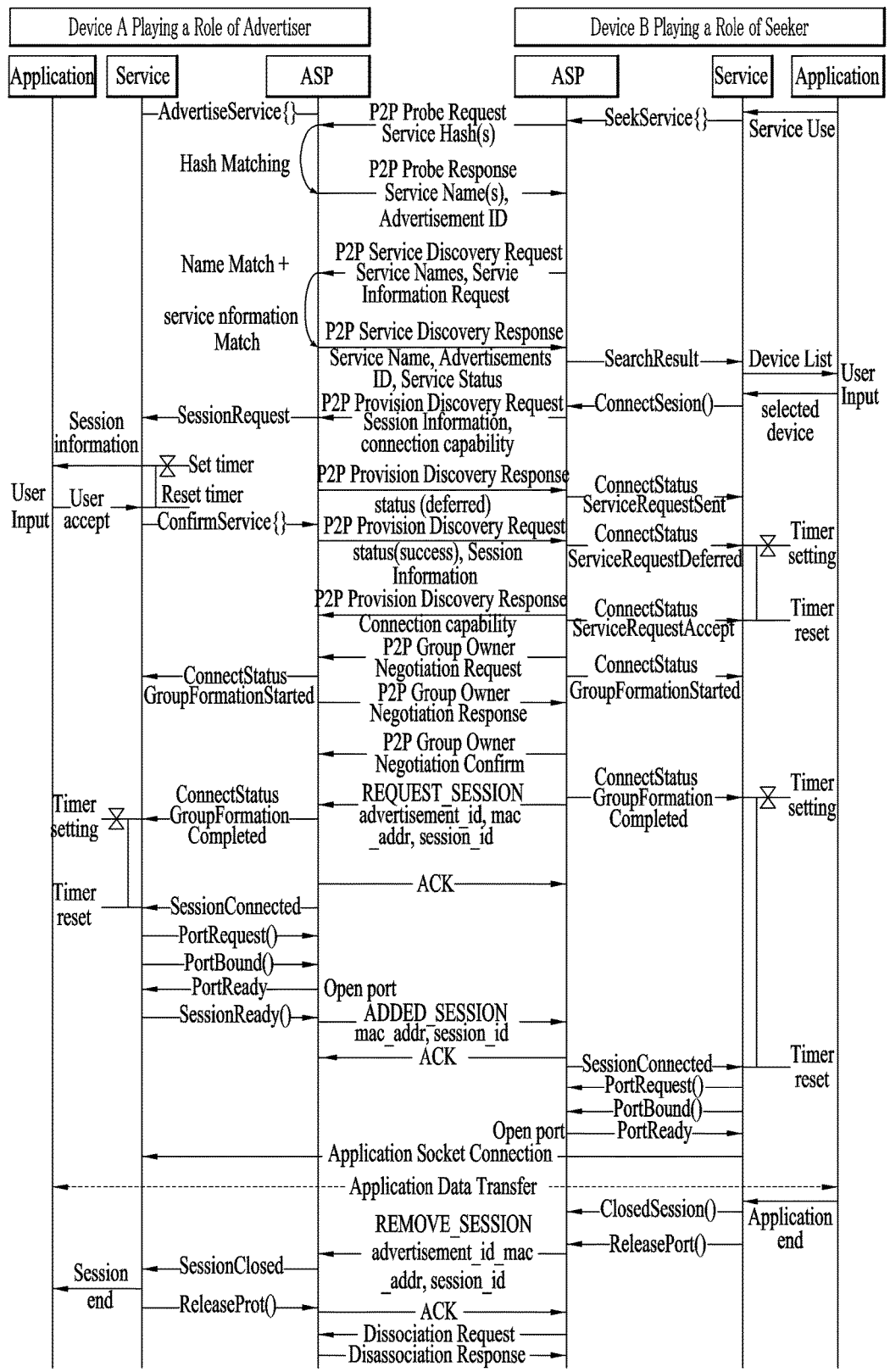
FIG. 12 is a diagram illustrating an ASP session setup sequence in a WFDS.

FIG. 12 is a diagram illustrating an ASP session setup sequence in a WFDS.

In case of defining an operation between peer devices in a WFDS, one device may play a role of a service advertiser and another device may play a role of a service seeker. The service seeker discovers a service advertiser(s). If the service seeker discovers a preferred service, the service seeker may request connection with the service advertiser. According to an example of FIG. 12, a device A performs role of the service advertiser and a device B performs a role of the service seeker.

An ASP session setup operation shown in FIG. 12 is briefly explained in the following. A specific service of a WFDS device searches for a different WFDS and a service, requests a service and establishes a Wi-Fi Direct connection. In doing so, an application can operate.

In FIG. 12, the device A advertises a service of the device A and may stand by to enable a different device to discover the service of the device A. An ASP of the device A may respond to the different device based on information included in Advertisement( ) method provided from a service layer.

The device B corresponds to a device intending to search for a service and start the service. The device B performs a process of searching for a device supporting a service based on a request of a higher layer application or a request of a user. If a service layer of the device B receives information indicating intention of using (use service) a service from an application layer, the service layer of the device B includes necessary information in a SeekService( ) method and can deliver the SeekService( ) method to an ASP.

Subsequently, the ASP of the device B can transmit a probe request frame to a different device. In this case, the ASP of the device B includes a service name of a service, which is intended to be found out by the ASP of the device B or is capable of being supported by the ASP of the device B, in the probe request frame in a hash form.

Having received the probe request frame, the device A attempts hash matching. If a service corresponding to a hash value is supported, the device A can transmit a probe response frame to the device B. The probe response frame can include a service name, an advertisement ID value and the like.

The aforementioned process of transceiving the probe request/response frame can be called a device discovery process enabling a user to aware that the device A and the device B correspond to devices supporting a WFDS and a service supported by each of the devices.

In addition, information on detail item of a specific service can be transceived between the device A and B via a P2P service discovery process. For instance, information such as a service name (in case of exploring whether to support a plurality of services, a plurality of service names), a service information request and the like can be delivered to the device A from the device B via a service discovery request message. The device A performs service information matching in response to the information delivered from the device B. If the service information is matched with each other, the device A can inform the device B that a corresponding service is capable of being provided. For instance, a service discovery response message can include such information as a service name, an advertisement ID, a service status and the like. The service status information corresponds to information informed by a service advertiser to indicate whether a service requested by a remote device is available. The aforementioned service discovery process can be performed using a GAS (generic advertisement protocol) defined by IEEE 802.11u system.

If the operation requested by the SeekService( ) method, which is requested by the service layer, is completed, the ASP of the device B can inform an application and a user of a result (i.e., SearchResult) of the operation via a service.

A group of Wi-Fi Direct has not been formed yet at this point. If a user selects a service and the service performs session connect (i.e., ConnectSession), P2P group formation is proceeded. In this case, session information and connection capability information are exchanged with each other via a provision discovery request and a provision discovery response.

The session information corresponds to hint information indicating rough information of a service requested by a service. For instance, if a file transfer service is requested, the session information informs a counterpart of the number of files, a size of the file and the like to enable the counterpart to determine whether to accept/reject the service request. The connection capability information can be used as information for generating a group in a GO (group owner) negotiation and a P2P invitation process.

If the device B delivers the provision discovery request message to the device A, an ASP of the device A delivers a session request (SessionRequest) including service information and the like to a service layer and the service layer delivers service information to an application/user. If the application/user determines to accept a corresponding session based on the session information, a confirmation (ConfirmService( )) is delivered to the ASP via the service layer.

During that time, the ASP of the device A delivers the provision discovery response message to the device B and status information of the provision discovery response message can be configured as 'deferred'. This is because it is necessary for the status information to indicate that a corresponding service is not immediately accepted and waits for a user input. Hence, an ASP of the device B delivers a ConnectStatus event to the service layer and may be able to inform that a service request is postponed.

If the ConfirmService( ) is delivered to the ASP of the device A, a follow-on provision discovery process can be performed. In particular, the device A can deliver a provision discovery request message to the device B. This is called a follow-on provision discovery process. The provision discovery request message can include information indicating that a status for a corresponding service is successful together with service information. In doing so, the ASP of the device B delivers a ConnectStatus event to the service layer and may be able to inform that a service request is accepted. And, the ASP of the device B can deliver a provision discovery response message to the device A and the connection capability information can be included in the provision discovery response message.

After the P2P provision discovery process is performed, a P2P group is generated via a GO negotiation process or an invitation process and second layer (L2) connection and IP (internet protocol) connection are performed. Detail explanation on the GO negotiation process is omitted at this time.

If the GO negotiation is completed and P2P connection or IP connection is generated, the device A and the device B deliver a REQUEST_SESSION message via an ASP coordination protocol to request a session. The REQUEST_SESSION message can include an advertisement ID, MAC address (mac_addr), a session ID and the like. The MAC address corresponds to an address of a P2P device. The device A can deliver an ACK message to the device B in response to the REQUEST_SESSION message.

Having received the ACK message, the device A informs a higher layer service/application that a session is connected. The service layer requests port information on the session and may be able to bind the session and a port with each other. In doing so, the ASP opens the port (the ASP can open the port in a firewall) and can inform the service layer that the port is ready. The service layer can inform the ASP that the session is ready (SessionReady( )).

Subsequently, the ASP of the device A transmits an ADDED_SESSION message to a counterpart device. In this case, the ADDED_SESSION message can include a session ID, MAC address information and the like to uniquely identify a service. Having received the ADDED_SESSION message, the ASP of the device B informs the service layer of the session connection and may be able to inform the service layer that a port is ready (PortReady( )) in a manner of passing through a port request, port binding and the like. The ASP can open a port in a firewall.

Subsequently, an application socket connection is informed between a service layer of the device A and a service layer of the device B and a link for transmitting application data is formed by an application layer. By doing so, the application data can be transceived.

An application/user of the device B can indicate closing (Close Application) of a corresponding application to a service layer. Hence, the service layer delivers a session closing (closedSession( )) method to an ASP and may be able to inform the ASP that a corresponding port is released.

Hence, the ASP of the device B can ask the device A to terminate a connected service via a REMOVE_SESSION message. The REMOVE_SESSION message can include an advertisement ID, a MAC address, a session ID and the like.

An ASP of the device A informs an application/user of closing of a session via a service layer and the service layer can inform the ASP of port release. Hence, if a session active for a corresponding service does not exist, the ASP can close an incoming port in a firewall. The device A can deliver an ACK message to the device B in response to the REMOVE_SESSION message. If a session active for a corresponding service does not exist, an ASP of the device B can also close an incoming port in a firewall.

Subsequently, the device A and the device B can terminate P2P connection and mutual association via a disassociation request/response.

When a service request is initiated using a P2P provision discovery process, a message sequence between a service seeker and a service advertiser has been explained with reference to the example shown in FIG. 12. In the example of FIG. 12, it is assumed that auto_accept is set to FALSE (if the auto_accept is set to TRUE, an ASP can operate to accept all ASP-session service requests without a ConfirmationService method from a service). And, each ASP can inform a service of a current status using a SessionStatus event and a ConnectionStatus event.

Method of Switching Service

Two WFDS devices can perform request, add, reject, remove and the like of an ASP-session via an ASP coordination protocol. The ASP coordination protocol corresponds to a separate control protocol defined by a WFDS and provides a method of communicating via a UDP (user datagram protocol) between ASPs.

According to a related art, when there exist a plurality of service types capable of being commonly provided by the two WFDS devices, although a method of connecting a single service is defined by the related art, a method of switching a service between services different from each other and such a mutual operation between services as a method of returning to an original service are not defined yet.

For instance, when both a WFDS device A and a WFDS device B support a Play service and a Display service, according to the related art, although independently performing each service is defined, switching between the Play service and the Display service and contents on returning to a service are not defined at all.

The Play service (e.g., DLNA) corresponds to a service for sharing or streaming file-based local contents such as AN, pictures, music and the like. Although the Display service (e.g., Miracast) is similar to the Play service, the Display service corresponds to a screen mirroring technology for transmitting a screen of a transmission (Tx) device to a reception (Rx) device in a manner of encoding the screen in real time instead of sharing/streaming the file-based contents.

Table 1 in the following compares characteristics of the Display service and characteristics of the Play service with each other.

TABLE 1

|  | Display Service (Miracast) | Play Service (DLNA) |
| --- | --- | --- |
| Transcoding | Converted by H.264 video format (720p) | Not necessary |
| Power consumption (measured at transmission device) | Consume more than DLNA (about 2100~3700 mWh) | (about 1850 mWh) |
| Overheat (at transmission device) | occurs (due to hardware encoding and decoding) | — |
| latency | Lower than DLNA | Buffering is required (may vary according to implementation) |
| Video quality | Degraded due to transcoding | Original quality |
| Contents | Any content displayed on screen | Video format supported by receiving end only |

As shown in Table 1, the Display service is appropriate for sharing a home screen, an application screen and not typical A/V contents. Yet, file contents are not suitable for the Display service due to a burden of transcoding. Although the Play service has a merit in that file-based media streaming can be performed without damaging original quality, the Play service is unable to support mirroring of a screen itself.

As mentioned in the foregoing description, although two types of screen sharing service are common in that the Play service and the Display service are services displaying contents on a screen, the two types of service are complementarily or alternately applied. If a Tx device transmits file-based A/V contents using Miracast, the A/V contents are locally decoded and transmitted in a manner of being encoded again, thereby generating overhead. In case of encoding the contents again, quality deterioration occurs. In this case, it is more efficient to transmit the contents using the Play service instead of the Display service. Or, when the Tx device intends to share non-file-based contents such as game or a home screen with an Rx device, since it is difficult to implement screen sharing using the Play service, it is more efficient to apply the Display service. As mentioned in the foregoing description, in case of a complementary and alternative service, it is required to have a method for an ASP to support such an operation as switching between services, changing and returning.

Examples of the present invention are explained in a manner of assuming a case of switching to the Play service while the Display service is performed or a case of switching to the Display service while the Play service is performed, by which the present invention may be non-limited. As a different example, if first layer/second layer (L1/L2) throughput is not sufficient enough to support both the Display service and the Send service, the Display service can be switched to the Send service while the Display service is performed or the Send service can be switched to the Display service while the Send service is performed in a manner of identically apply the principle proposed by the present invention.

When an application intends to switch a service into a different service, it is able to assume a following situation.

For instance, it is able to assume a case that an application of a seeker device calls seek (SeekService(org.wi-fi.wfds.play.rx, . . . ) of the Play service of a receiving side and seek (SeekService(org.wi-fi.wfds.display.rx, . . . ) of the Display service of the receiving side to a service. In this case, the application can determine to switch a service into a different service based on various information including an input of a user, a device policy, throughput measurement and the like.

Or, in order to find out whether an advertiser device, which has called a standby (AdvertiseService(org.wi-fi.wfds.play.tx, . . . ) of the Play service of a transmitting side, and a seeker device, which has called seek (SeekService(org.wi-fi.wfds.play.tx, . . . ) of the Play service of the transmitting side, support the Display service (org.wi-fi.wfds.display.rx) of a receiving side, it may be able to assume a case of calling seek (SeekService(org.wi-fi.wfds.display.rx, . . . ) of the Display service of the receiving side. In this case, an application can determine to switch a service based on various information including an input of a user, a device policy throughput measurement and the like.

FIGS. 13 to 16 are diagrams illustrating service switching according to one embodiment of the present invention.

Figure 13:
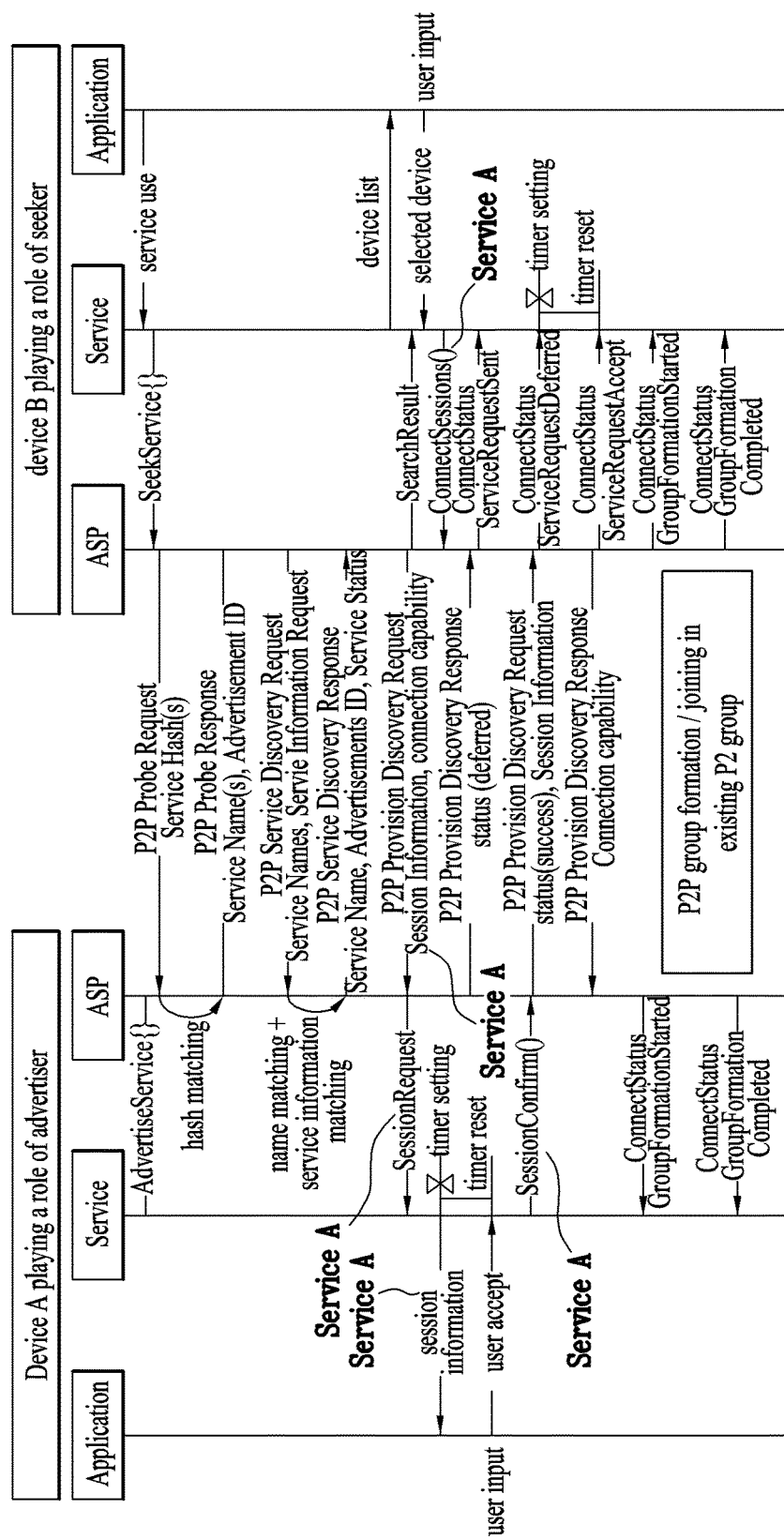
FIGS. 13 to 16 are diagrams illustrating service switching according to one embodiment of the present invention.
Figure 14:
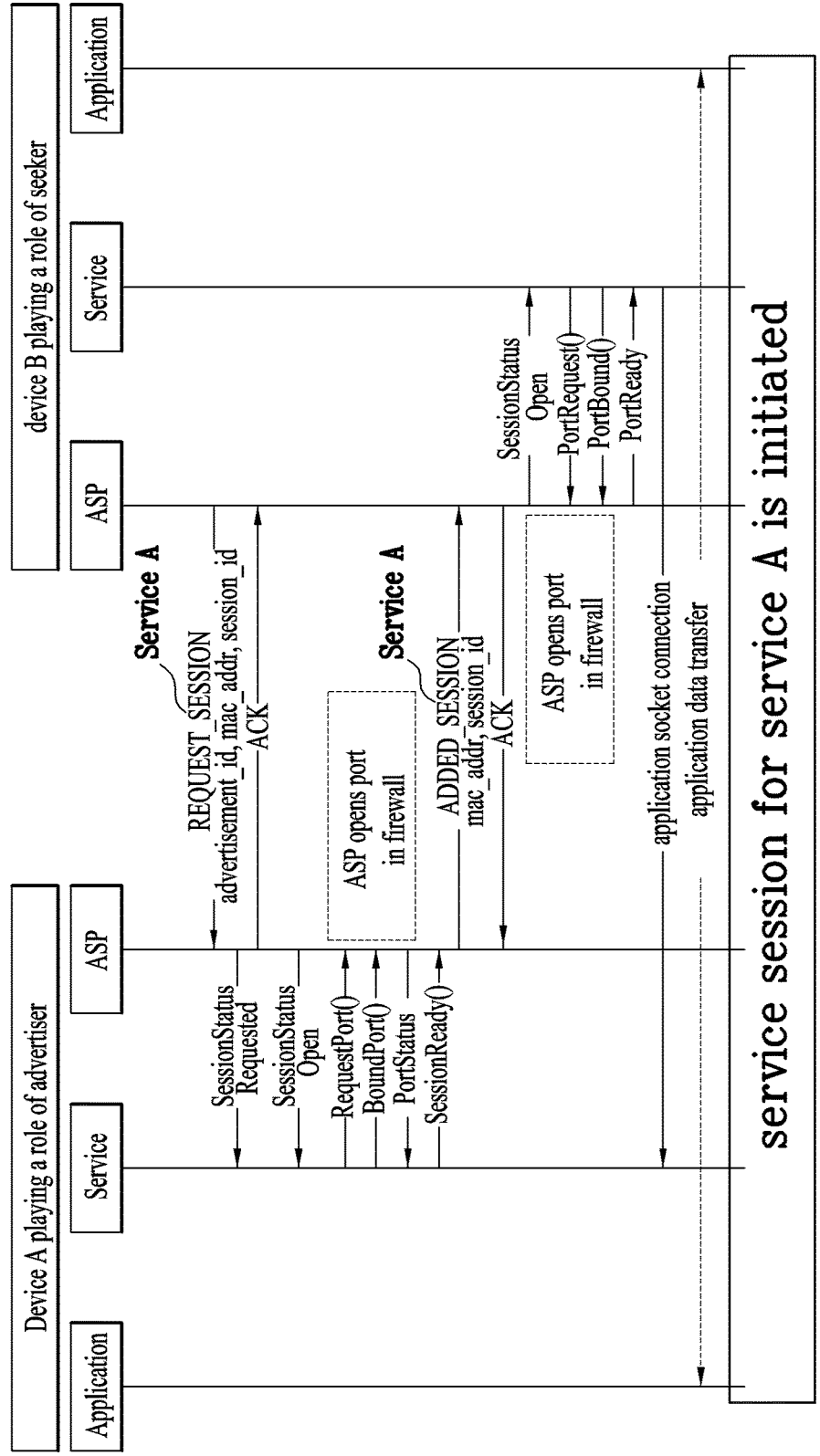

FIG. 13 and FIG. 14 show an operation, i.e., an ASP-session setup operation for a service A. FIG. 13 shows a probe request/response, a service discovery request/response, a provision discovery request/response for the service A and a GO negotiation process.

Seeking for two types of service including a first service (service A) and a second service (service B) is performed via a process shown in FIG. 13. In particular, a second device (device B) is able to check whether a first device (device A) supports the service A and the service B via a device discovery process and/or a service discovery process. If the device A and the device B support both the service A and the service B, according to an example of FIG. 13, session information on the service A and connection capability can be exchanged between the device A and the device B via a provision discovery request/response process for the service A.

Specifically, assume that the device A supports both the service A and the service B and the device B supports both the service A and the service B. Each of the service A and the service B supported by the device A informs an ASP of a service supported by each service using an AdvertiseService( ) method. And, Each of the service A and the service B supported by the device B informs an ASP of a service supported by each service using an AdvertiseService( ) method.

If an application/user finds out a new service and puts an input to drive the service, the service searches for a device supporting the service among surrounding WFDS supporting devices via an ASP.

In an example of FIG. 13, assume that an application/user of a device B intends to use a service A (use service). Hence, the service A delivers a SeekService( ) method to an ASP. Hence, the ASP can search for a surrounding WFDS device supporting the service A using a P2P probe request/response message.

Specifically, the probe request message can include a hash value of a service becoming a target of the search. Having received the probe request message, if the service hash value is matched with each other, a device A can transmit a probe response message in a manner of including the hash value or a service name in the probe response message. In case of scanning a WFDS device supporting a plurality of services, a probe request frame can include a plurality of service names or a plurality of service hash values.

Table 2 and Table 3 in the following shows a format of information capable of being additionally included in a probe response message proposed by the present invention.

TABLE 2

| Field | Size (octet) | Value | Description |
|---|---|---|---|
| Attribute ID | 1 | 23 | Information identifying type of P2P Attribute |
| Length | 2 | Variable | Information indicating length of following fields |
| Advertised Service Descriptor(s) | Sum of all advertised service descriptor(s) | — | List of advertised service descriptor(s) |

TABLE 3

| Field | Size (octet) | Value | Description |
|---|---|---|---|
| Advertisement ID | 4 | 0-ffffffff | Advertisement ID of local service |
| Service hash | 6 | variable | Service hash (matched with service hash requested by probe request) |
| Service notice | 1 | variable | 0x00 - service is available but service information is unavailable<br>0x01 - service is unavailable and service information is also unavailable<br>0x02 - service is available and service information is also available<br>0x03 - service is unavailable but service information is available |
| Service handover | 1 | variable | 0x00 - service handover is not supported<br>0x01 - service handover is supported |

TABLE 4

| Field | Size (octet) | Value | Description |
|---|---|---|---|
| Advertisement ID | 4 | 0x00000000-0xFFFFFFFF | Advertisement ID of local service |
| Service config methods | 2 | Config method | WSC (Wi-Fi Simple Configuration) method supported for corresponding service |
| Service name length | 1 | 0x00-0xFF | Length of service name |
| Service name | variable | variable | UTF-8 string defining service |

According to a legacy scheme, since information on a single service is included in a probe response message, it was necessary to exchange a probe request/response frame many times to perform a device discovery for a plurality of services.

According to the present invention, such a field as an advertised service info is defined in a P2P probe response frame, one or more advertised service descriptors are included in the advertised service info and it is defined as one advertised service descriptor includes information on a single service. In particular, the advertised service info shown in Table 2 is included in a single probe response message and one or more advertised service descriptors shown in Table 3 or Table 4 are included in the advertised service info. Table 3 or Table 4 shows a format of subfields of a single advertised service descriptor.

At least one of a service notice field indicating whether a corresponding service is supportable and information indicating whether a corresponding service supports a service handover can be included in the advertised service descriptor. A service corresponding to an advertised service descriptor of which a service handover field is set to 0x01 may be able to indicate that a service handover is applicable.

After a device is discovered via the aforementioned P2P probe request/response process, a service discovery request/response process can be additionally performed.

Table 5 and Table 6 show service information included in a service discovery response message.

TABLE 5

| Field | Size (octet) | Value | Description |
|---|---|---|---|
| Length | 2 | 0x0003-0xffff | GAS response length |
| Service protocol type | 1 | 0x05 | Wi-Fi Direct services |
| Service transaction ID | 1 | 0x00-0xff | Transaction ID from GAS initial request |
| Number of service info descriptor | 1 | 0x01-0xff | Number of service info descriptor |
| Service info descriptor(s) | Sum of all service info descriptor(s) | | |

TABLE 6

| Field | Size (octet) | Value | Description |
|---|---|---|---|
| Advertisement ID | 4 | 0-ffffffff | Advertisement ID of local service |
| Service status | 1 | 0x00-0xff | 0x00 - available<br>0x01 - unavailable<br>TBD - failure code<br>If fails, following fields are omitted |

TABLE 6-continued

| Field | Size (octet) | Value | Description |
|---|---|---|---|
| Service handover | 1 | 0x00-0x01 | 0x00 - not supported<br>0x01 - supported |
| Service name length | 1 | 0x01-0xff | Length of service name |
| Service name | Variable | Variable | Complete service name matched with service name prefix or service name |
| Service information length | 2 | 0x0000-TBD | Length of service information |
| Service information | Variable | Variable | Service information data defined by application |

According to a legacy scheme, since information on a single service is included in a service discovery response message, it was necessary to exchange a service discovery request/response frame many times to perform service discovery for a plurality of services.

According to the present invention, one or more service info descriptor fields can be defined in a P2P service discovery response frame. As shown in Table 5, a field indicating the number of service info fields included in the P2P service discovery response frame can also be defined. Table 6 shows a format of subfields of a single service info descriptor. The service info descriptor can include at least one selected from the group consisting of a service status field, a service handover field, a service name length field, a service name field, a service information length field, and a service information field.

As mentioned in the foregoing description, the device A and the device B can perform a device discovery and a service discovery for the service A and the service B via a single device discovery process and a service discovery process.

FIG. 14 shows a session request for a service A and a process of adding a session for the service A.

Since detail items of the process shown in FIG. 14 are identical to the corresponding process of FIG. 12, explanation on overlapped items is omitted at this time. A session for the service A is initiated by a result of operations shown in FIG. 13 and FIG. 14.

Figure 15:
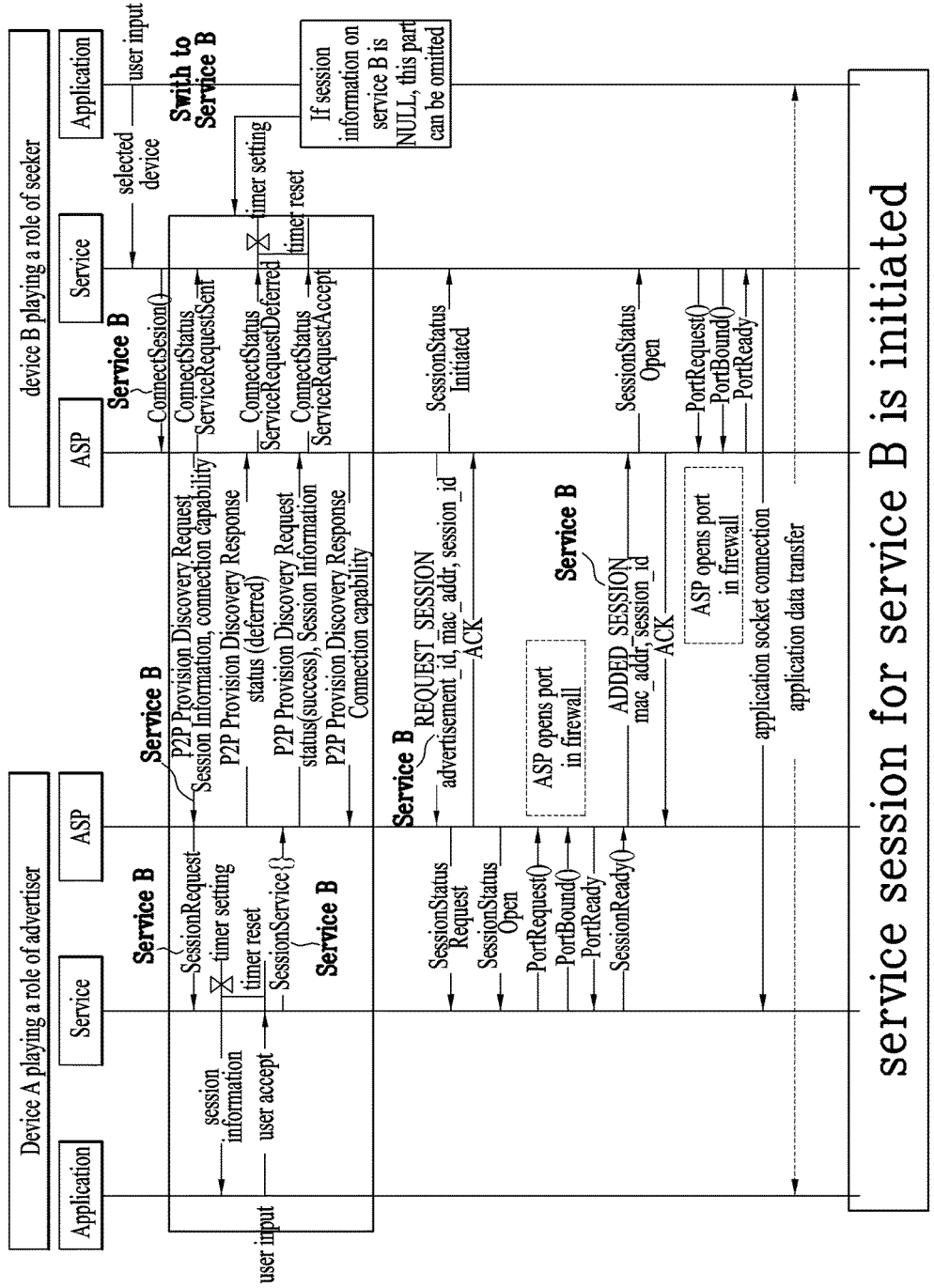
Figure 16:
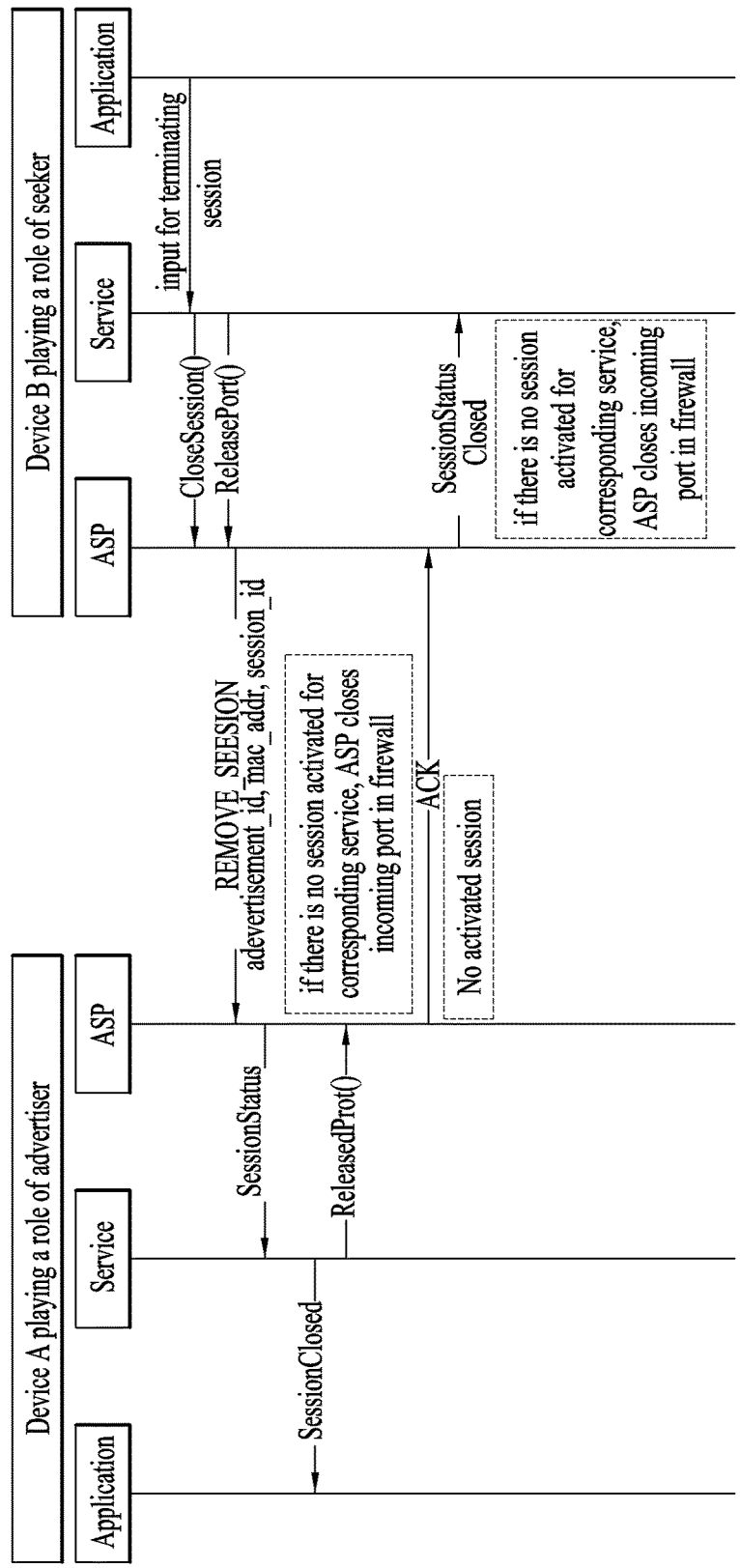

FIGS. 15 to 16 show ASP-session setup operation for a service B.

As shown in FIG. 15, if an application calls a service B between two devices at which a session for a service A exists, switching to the service B from the service A should be performed. To this end, it is necessary to setup a new session for the service B.

In this case, according to a related art, it is defined as it is necessary to perform a provision discovery request/response process, a GO negotiation process, a session request process and a session adding process to add a new service B between devices. Yet, when P2P connection already exists between a device A and a device B, if connection capability information is exchanged between the device A and the device B via the provision discovery request/response process to setup a session for the service B, it may be unnecessary or inefficient.

Hence, as shown in FIG. 15, in order to perform switching to the service B from the service A, the session request process and the session adding process can be directly performed for the session setup of the new service B while the provision discovery request/response process is skipped.

A message sequence has been explained via the example shown in FIG. 15 in case that L2 (second layer)/L3 (third layer) connection (e.g., IP connection or P2P connection) is already configured between a service advertiser and a service seeker. In this case, the service seeker can initiate a service request using a REQUST_SESSION message without performing a provision discovery process.

FIG. 16 shows an operation of an ASP terminating an ASP session for a service A. If a service seeker device indicates to terminate a session for a service A by a user input, a service terminating process can be performed according to the user input.

Figure 17:
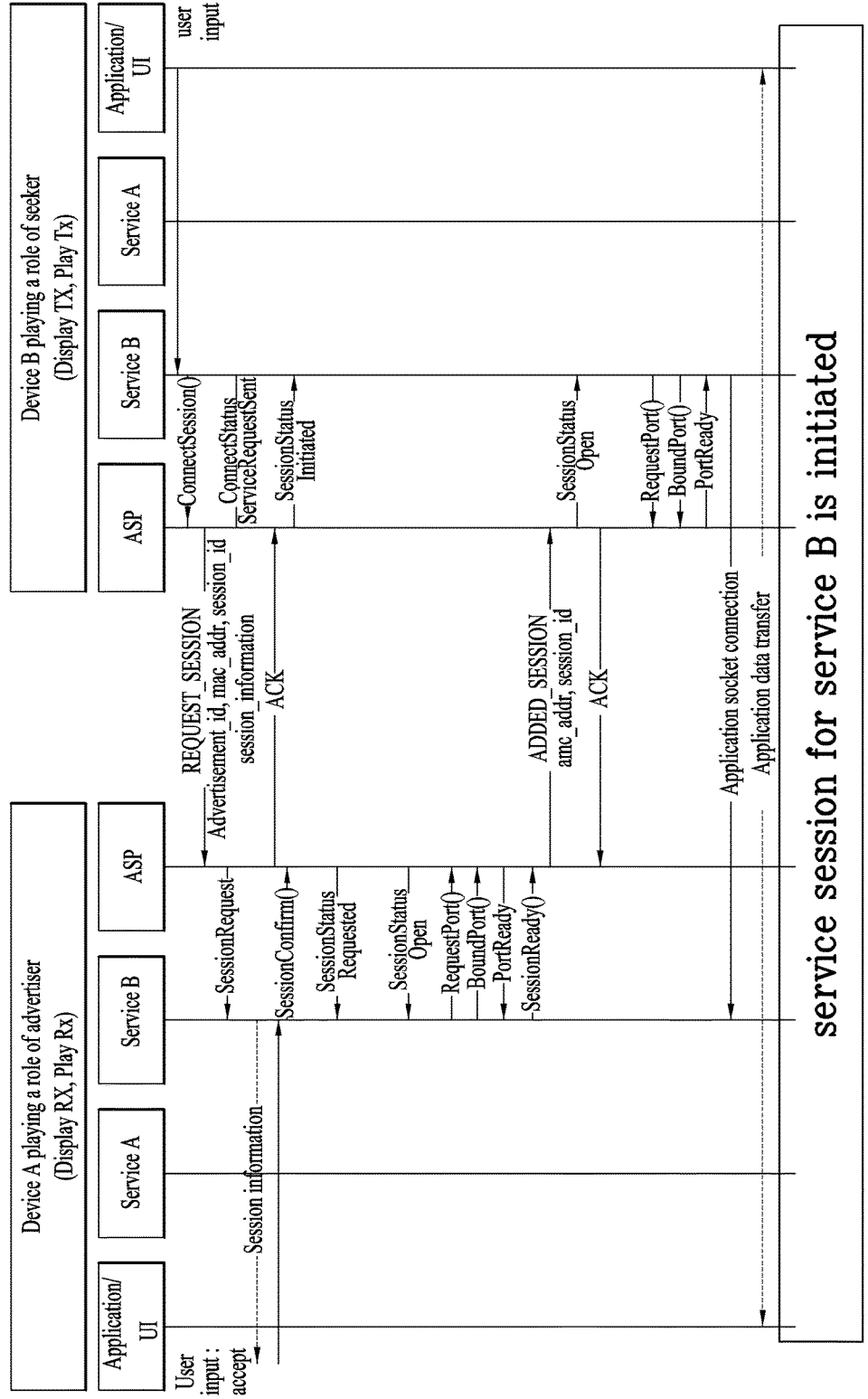
FIG. 17 is a diagram illustrating service switching according to an additional embodiment of the present invention.

FIG. 17 is a diagram illustrating service switching according to an additional embodiment of the present invention.

FIG. 17 shows an operation performed instead of FIG. 15. In particular, a service switching operation according to an additional example of the present invention can perform a session setup (FIG. 13 and FIG. 14) for a service A, a session setup (FIG. 17) for a service B and a session closing (FIG. 16) for the service A in an order of FIG. 13, FIG. 14, FIG. 17 and FIG. 16.

According to an example of FIG. 17, if a user input for service switching occurs in a device B, a service B can indicate an ASP to connect a session. Subsequently, the ASP of the device B delivers a session request (REQUEST_SESSION) message to a device A. The session request message can include session information (i.e., session information on the service B). The service B of the device A can receive user input for the session setup of the service B from a user via an application based on the session information included in the session request message.

If the service B is unavailable in the device A or the service B is rejected by a user/application, it may be able to deliver a REJECTED_SESION message instead of an ADDED_SESSION message of FIG. 17.

A message sequence has been explained via the example shown in FIG. 17 in case that L2 (second layer)/L3 (third layer) connection (e.g., IP connection or P2P connection) is already configured between a service advertiser and a service seeker. In this case, the service seeker can initiate a service request using a REQUST_SESSION message without performing a provision discovery process. In this case, service information (hint information or meta data) is included in the REQUEST_SESSION message.

Figure 18:
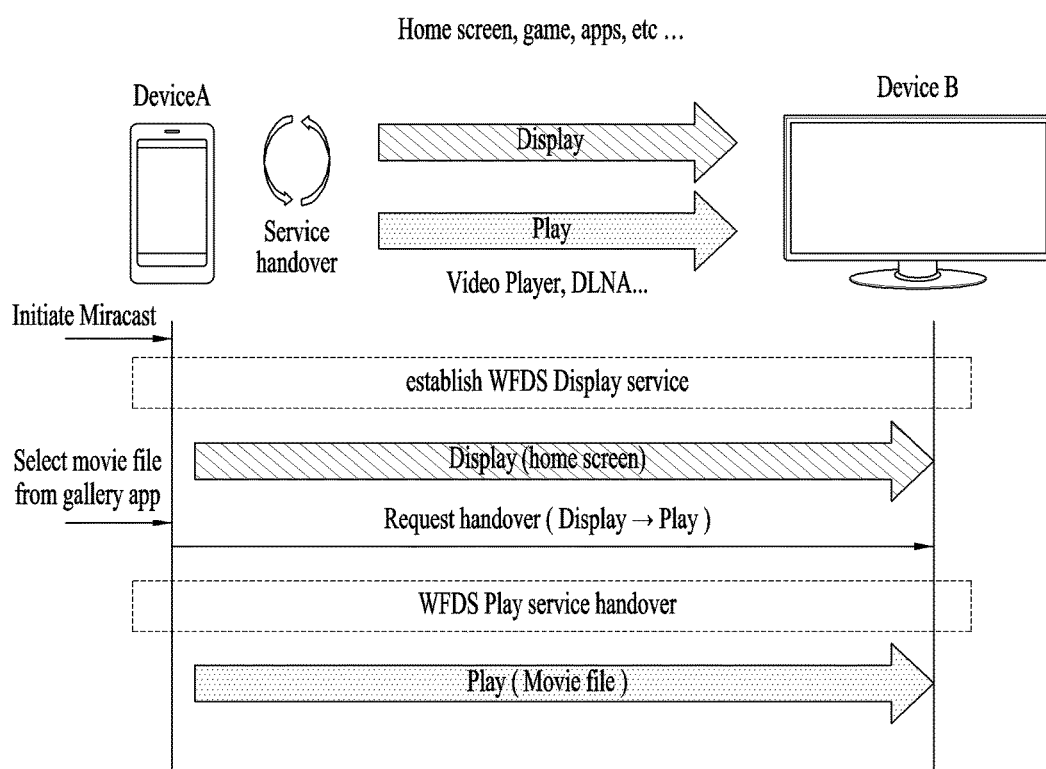
FIG. 18 is a diagram illustrating a service handover proposed by the present invention.

FIG. 18 is a diagram illustrating a service handover proposed by the present invention.

Seamless handover between WFDS services (e.g., Display service and Play service) is very important for enhancing quality of user experience.

In an example of FIG. 18, assume a case that Display service (e.g., Miracast) between a device A and a device B is initiated by a user input of the device A. in particular, the device A plays a role of a transmitting side or a source for the Display service and the device B plays a role of a receiving side or a sink for the Display service. A screen of a home screen, game, an application (Apps) or the like executed by the device A can be displayed on the device B by the Display service.

According to the example of FIG. 18, if the Display service is initiated and a WFDS Display service is established between the device A and the device B, for instance, a home screen of the device A can be displayed on the device B by the Display service.

In this case, assume a case that a user of the device A selects a movie file by executing a gallery application. In this case, the Display service is not appropriate for processing a file-based content. It is preferable to provide a service of displaying the file-based content by the Play service. Hence, it is required to perform handover (or the aforementioned service switching) to the Play service from the Display service.

Referring to the example of FIG. 18, a handover request (i.e., a request of handover/switching to the Play service from the Display service) message is delivered to the device B from the device A, a WFDS service handover is performed and the movie file selected by the user of the device A can be played on the device B by the Play service. In particular, the device A performs a role of a transmitting side or "+PU+" (push controller) and the device B performs a role of a receiving side or a DMR (digital media renderer).

Figure 19:
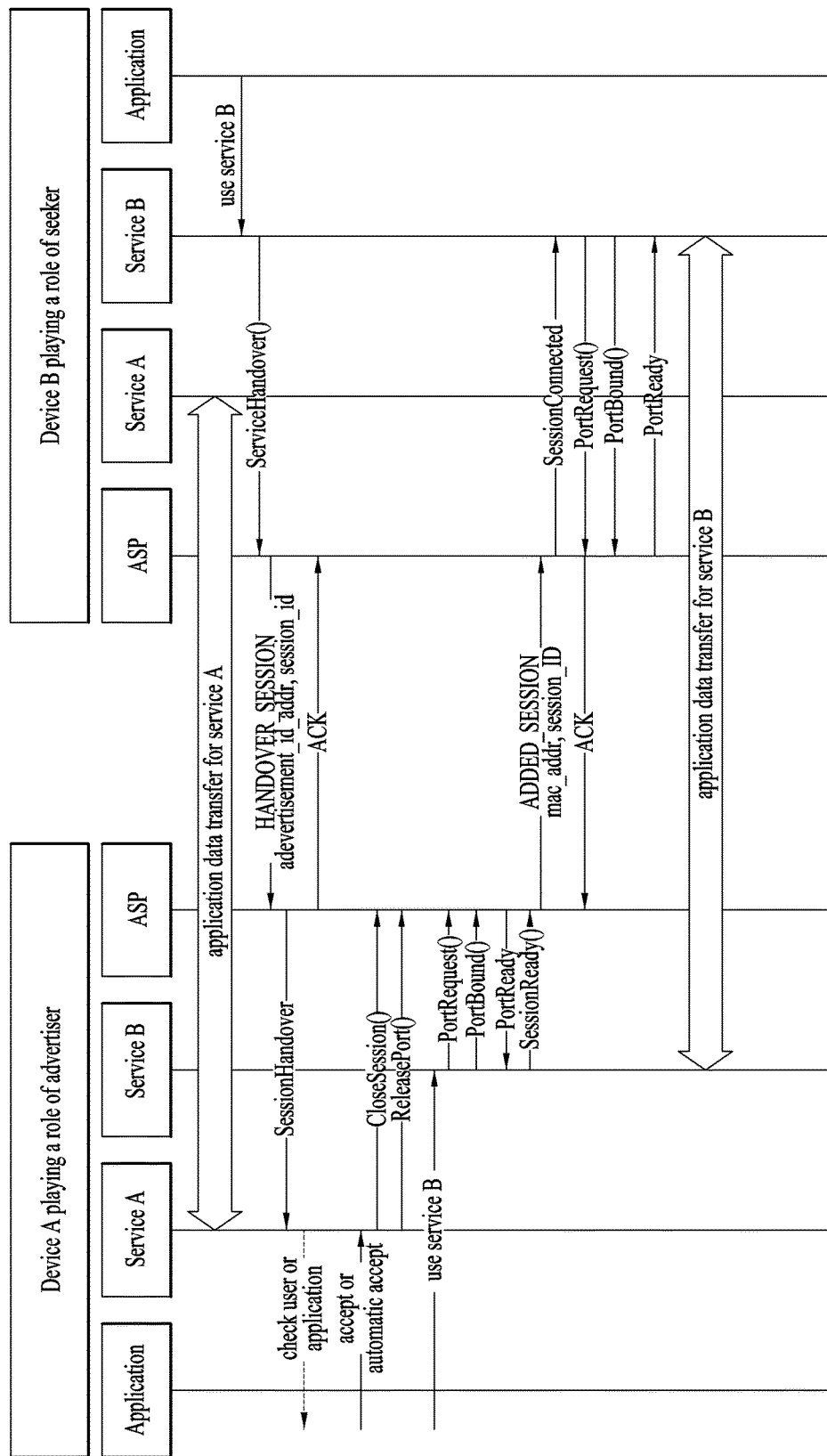
FIG. 19 is a diagram illustrating a service handover procedure according to an additional embodiment of the present invention.

FIG. 19 is a diagram illustrating a service handover procedure according to an additional embodiment of the present invention.

An example of FIG. 19 can be comprehended as the service switching method mentioned earlier with reference to FIG. 13 to FIG. 16 is replaced with operations described in FIG. 15 to FIG. 16. In particular, a service handover operation according to an additional example of the present invention can perform a session setup (FIG. 13 and FIG. 14) for a service A in an order of FIG. 13 and FIG. 14 and handover (FIG. 19) to a service B from the service A.

Assume that both the device A and the device B support such an identical service as a service A and a service B and both the service A and the service B support service handover.

In the example of FIG. 19, an application/user of the device B determines to make a handover to the service B in the middle of performing the service A and may be able to inform the service A of the determination. Subsequently, the service A can deliver a method (ServiceHandover( )) indicating a service handover to an ASP.

The service B of the device B asks the ASP to make a handover to the service B via the ServiceHandover( ) method. Having received the request, the ASP of the device B asks the ASP of the device A to make a handover using a HANDOVER_SESSION message of an ASP coordination protocol. In this case, advertisement_id, mac_address and session_id information of the service B corresponding to a target of the handover can be included in the HANDOVER_SESSION message. Having received the HANDOVER_SESSION message, the ASP of the device A can deliver a SessionHanover( ) event to the service A. Whether the requested service handover is accepted or rejected can be determined by configuration of an application or a user. The service A currently performed in the device A may close a current session and cancel a port in use according to acceptance for the handover of an application/user. Subsequently, the application/user adds a session for the service B and informs the device B of a result of the added session via an ADDED_SESSION message of an ASP coordination protocol. Having received the ADDED_SESSION message, the ASP of the device B becomes aware of the acceptance of the handover of the device A and may be able to perform the service B.

For a session handover operation such as the example of FIG. 19, a new Opcode can be defined in the ASP coordination protocol. The Opcode can indicate a message type. For instance, as shown in Table 7 in the following, an Opcode 4 can be defined as an Opcode indicating a HANDOVER_SESSION message.

TABLE 7

| Opcode | Message |
| --- | --- |
| 0 | REQUEST_SESSION |
| 1 | ADDED_SESSION |
| 2 | REJECTED_SESSION |
| 3 | REMOVE_SESSION |
| 4 | HANDOVER_SESSION |
| 5 | ACK |
| 6-127 | Reserved |

[Table 8] shows a format of a HANDOVER_SESSION message related to embodiment of FIG. 19.

| Field | Size (octet) | value | description |
| --- | --- | --- | --- |
| Message type (Opcode) | 1 | 0x04 | Value indicating message type corresponding to HANOVER_SESSION |
| Sequence number | 1 | Variable | Sequence number assigned to transmission time |
| advertisement_id | 2 | Variable | ID indicating service advertised by receiving side of the present message |
| session_mac | 6 | variable | MAC address used in a manner of being combined with session_id to uniquely identify ASP-session |
| session_id | 4 | variable | ID used in a manner of being combined with session_mac to uniquely identify ASP-session |

Figure 20:
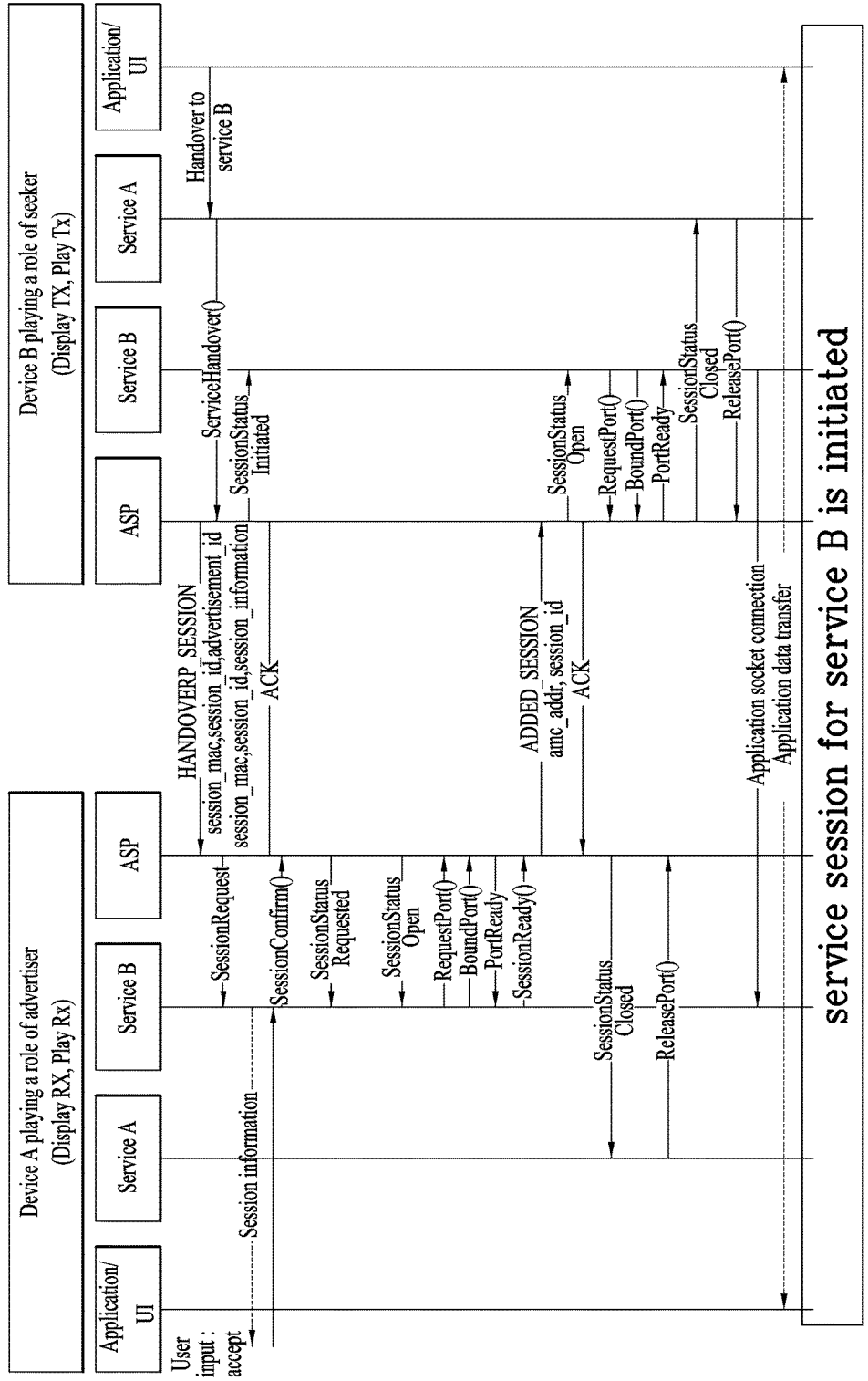
FIG. 20 is a diagram illustrating a service handover procedure according to one embodiment of the present invention.

FIG. 20 is a diagram illustrating a service handover procedure according to one embodiment of the present invention.

An example of FIG. 20 can be comprehended as the service switching method mentioned earlier with reference to FIG. 13 to FIG. 16 is replaced with operations described in FIG. 15 to FIG. 16. In particular, a service handover operation according to an additional example of the present invention can perform a session setup (FIG. 13 and FIG. 14) for a service A in an order of FIG. 13 and FIG. 14 and handover (FIG. 19) to a service B from the service A.

Assume that both the device A and the device B support such an identical service as a service A and a service B and both the service A and the service B support service handover.

In the example of FIG. 20, an application/user of the device B determines to make a handover to the service B in the middle of performing the service A and may be able to inform the service A of the determination. Subsequently, the service A can deliver a method (ServiceHandover( )) indicating a service handover to an ASP.

A method for a service handover can be defined by ServiceHandover (service_mac, advertisement_id, session_information, session_mac, and session_id).

In this case, the service_mac field indicates MAC address of a remote P2P device. The service_mac field can have a value identical to a value returned by SearchResult event mentioned earlier in FIG. 13. The advertisement_id field can indicate an advertisement ID of a handover target service (i.e., service B). The session_information field may correspond to session information delivered by a service advertiser when a service handover is initiated. In some cases, the session_information field can be configured by NULL. The session_mac field indicates MAC address of a P2P device, which has assigned a session_id to a current ASP-session. The session_id field indicates a session identifier of a current ASP-session. The session_mac information and the session_id information can be retured by ServiceHandover( ) method.

Having received the ServiceHandover( ) method from the service A, the ASP of the device B sends a handover session (HANDOVER_SESSION) message to the device A and may be able to deliver a session status event, which is configured as Initiated, to the service B. This may indicate that an ASP of a service seeker has requested an ASP-session but is not ready to use the ASP-session. Or, it may indicate that the ASP of the service seeker is waiting for authentication of an advertiser or a network connection is not established yet.

The handover session message delivered to the device A by the device B can include such information as a session MAC (session_mac) for the service A, a session ID, an advertisement ID and the like and such information as a session MAC for the service B, a session ID, session information and the like. The session MAC (session_mac) information may indicate MAC address of a P2P device, which has assigned a session ID.

Subsequently, the ASP of the device A delivers a session request event (SessionRequest) to the service B and the service B delivers session information to an application/user and may be able to receive a user input (e.g., accept). If the user input is informed to the service B, the service B is able to deliver a confirmation method (SessionConfirm( )) to the ASP.

The ASP of the device A delivers a session status event to the service B and the status can be set to 'Requested'. This may indicate that an ASP of a service advertiser informs a service layer of a request of a session requested by a different device. And, the ASP of the device A can deliver a session status event which is configured as 'Open' to the service B. This may indicate that ASP-session setup is completed and is ready to use. Subsequently, if a session ready method (SessionReady( )) is delivered to ASP after method/event such as port request, port binding, port ready and the like is exchanged with each other between the service B of the device A and the ASP, the ASP can deliver an ADDED_SESSION message to the device B. Such information as a MAC address, a session ID and the like can be included in the ADDED_SESSION message. The ASP of the device B delivers a session status event, which is configured as 'Open', to the service B and the ASP can send an ACK message to the device A.

Subsequently, the ASP of the device B can deliver a session status event, which is configured as 'Closed', to the service A. This may indicate that a session status is switched to 'Open' or is switched to 'Closed' status from 'Initiated' status. By doing so, the service A can deliver a method (ReleasePort( )) indicating port release to the ASP.

Having received the ACK message from the device B, the ASP of the device A can deliver a session status event, which is configured as 'Closed', to the service A. By doing so, the service A can deliver a method (ReleasePort( )) indicating port release to the ASP.

Meanwhile, the service B of the device B informs the service B of the device A of application socket connection and an application layer forms a link for transmitting application data. In doing so, a status capable of transmitting and receiving application data is formed and a service session for the service B is initialized.

In an example of FIG. 20, if the service B is not available in the device A or a request for the service B is rejected by an application/user, the device A transmits a REJECTED_SESSION message to the device B instead of the ADDED_SESSION message and may be able to maintain an original session (i.e., a session for the service A).

For a session handover operation such as the example of FIG. 20, a new Opcode can be defined in the ASP coordination protocol. The Opcode can indicate a message type. For instance, as shown in Table 6, an Opcode 4 can be defined as an Opcode indicating a HANDOVER_SESSION message.

A format of the HANDOVER_SESSION message can also be defined as Table 9 or Table 10 in the following.

TABLE 9

| Field | Size (octet) | Value | Description |
|---|---|---|---|
| Opcode | 1 | 0x04 | Opcode defined in Table 2 |
| Sequence number | 1 | Variable | Sequence number assigned to transmission time |
| session_mac | 6 | Variable | session_mac of session_id for current ASP-session |
| session_id | 4 | Variable | ID of current ASP-session |
| advertisement_id | 2 | Variable | advertisement_id for handover target service |
| session_mac | 6 | Variable | session_mac of session_id for new ASP-session |
| session_id | 4 | Variable | ID of new ASP-session |
| session_information size | 2 | Variable | size of session information (maximum 144 octets) |
| session_information | Variable | Variable | Session information |

TABLE 10

| Field | Size (octet) | Value | Description |
|---|---|---|---|
| Opcode | 1 | 0x04 | Opcode defined in Table 2 |
| Sequence number | 1 | Variable | Sequence number assigned to transmission time |
| session_mac | 6 | Variable | session_mac of session_id for current ASP-session |
| session_id | 4 | Variable | ID of current ASP-session |
| advertisement_id | 2 | Variable | advertisement_id for handover target service |
| session_mac | 6 | Variable | session_mac of session_id for new ASP-session |
| session_id | 4 | Variable | ID of new ASP-session |
| session_information size | 2 | Variable | size of session information (maximum 144 octets) |
| session_information | Variable | Variable | Session information |

In Table 9 and Table 10, a value of an Opcode is set to 4 and it indicates a HANDOVER_SESSION message type according to Table 6.

Table 10 shows an example that advertisement_id information on a current service is further included compared to Table 9.

In order to support service switching or service handover, it may be able to use a REQUEST_SESSION message as well. In particular, a legacy REQUEST_SESSION message is modified in an ASP coordination protocol to use the modified legacy REQUEST_SESSION message as a message for setting up a new ASP-session in a situation that an ASP-session already exists. A format of the modified legacy REQUEST_SESSION message can be defined as Table 11 in the following.

TABLE 11

| Field | Size (octet) | Value | Description |
|---|---|---|---|
| Opcode | 1 | 0x04 | Opcode defined in Table 2 |
| Sequence number | 1 | Variable | Sequence number assigned to transmission time |
| session_mac | 6 | Variable | session_mac of session_id for current ASP-session |
| session_id | 4 | Variable | ID of current ASP-session |
| advertisement_id | 2 | Variable | advertisement_id for handover target service |
| session_mac | 6 | Variable | session_mac of session_id for new ASP-session |

TABLE 11-continued

| Field | Size (octet) | Value | Description |
| --- | --- | --- | --- |
| session_id | 4 | Variable | ID of new ASP-session |
| session_information size | 2 | Variable | size of session information (maximum 144 octets) |
| session_information | Variable | Variable | Session information |

Figure 21:
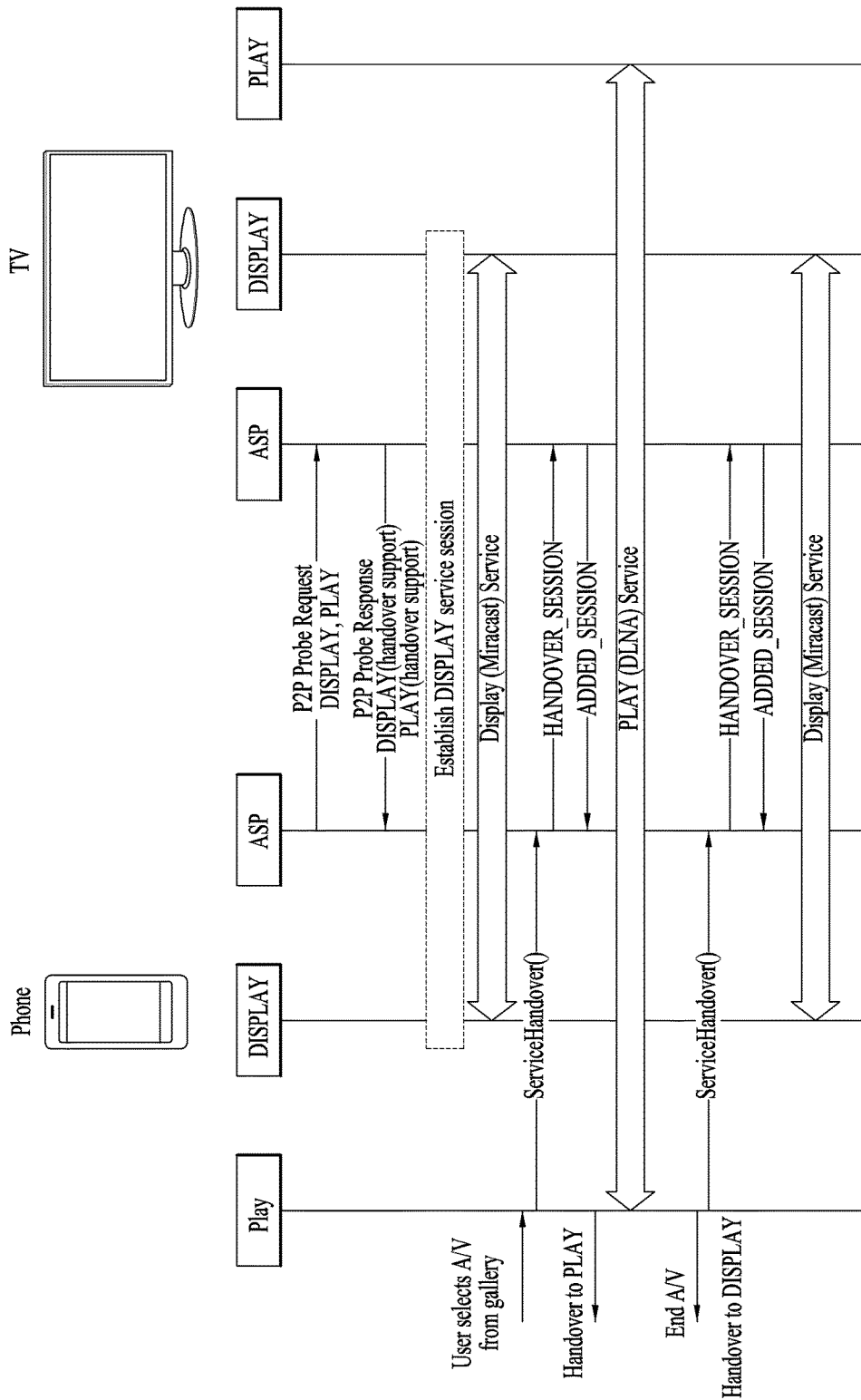
FIG. 21 is a diagram illustrating an additional example of a service handover according to the present invention.

FIG. 21 is a diagram illustrating an additional example of a service handover according to the present invention.

An example of FIG. 21 shows a service handover between a smartphone and a TV supporting a WFDS. Assume that the smartphone supports a transmitting side (TX) function of a Play service and a TX function of a Display service. Assume that the TV supports a receiving side (RX) function of the Play service and an RX function of the Display service.

The smartphone, which plays a role of a seeker via exchange of a probe request/response message in a device discovery process, is able to check a service supported by the TV playing a role of an advertiser and service handover capability.

Subsequently, the Display service (e.g., Miracast) is initiated after a session is established according to a WFDS specification. By doing so, the smartphone can mirror (screen mirroring) a screen of the smartphone on a screen of the TV. A user of the smartphone can select a specific AN file (i.e., a file-based video stored in storage of the smartphone) from a gallery in the middle of performing the Display service. In this case, the smartphone intends to transmit the file-based content to the TV via the Play service. Whether to switch or make a handover to the Play service in the middle of performing the Display service may follow configuration of the smartphone and/or a policy of a manufacturer.

In order to switch a service/make a handover, the smartphone delivers a HANDOVER_SESSION message to an ASP of the TV and attempts to make a handover to the Play service. If the TV accepts the handover, the handover to the Play service is performed. If the file-based video selected by the user ends or is stopped by the user, it may be able to return to an original service in a manner of making a handover to the previous Display service again.

Hence, according to the present invention, if WFDS devices support a common service, it is able to know whether making a handover is feasible at the time of discovering a device. And, making a handover between services or returning to an original service can be seamlessly performed via a control message between ASPs.

Additionally, the present invention proposes a ConnectionStatus event primitive called by an ASP to a service. The ASP uses the ConnectionStatus event to report progress on group formation of the ASP or a service request to the service. The ConnectionStatus event primitive can be defined by ConenctionStatus (session_mac, session_id, status).

The "Status" field indicates a current status of a state machine of an ASP of a service seeker or a service advertiser. The "session_mac" field indicates a MAC address of a P2P device, which has assigned the session_id. The "session_id" field indicates an ASP-session identifier assigned by an ASP, which has initiated an ASP-session.

The "status" field can be configured by ServiceRequestSent, ServiceRequestReceived, serviceRequestDeferred, ServiceRequestAccepted, ServiceRequestFailed, GroupFormationStarted, GroupFormationComplete, or GroupFormationFailed.

The ServiceRequestSent can be used by a service seeker only. In the service seeker, if an ASP in a Closed status receives a ConnectionSessions method from a service and there is no IP connection with an intended peer ASP, the ASP changes to a ServiceRequestSent status and may be able to transmit an event (e.g., ConnectionStatus event) indicating the ServiceRequestSent status.

The ServiceRequestReceived can be used by a service advertiser only. In the service advertiser, if an ASP in a Closed status receives a P2P provision discovery request for a pair of a new session_id and a session_mac or if the ASP receives a REQUEST_SESSION message from a peer ASP, the ASP changes to a ServiceRequestSent status and may be able to transmit an event indicating the ServiceRequestSent status.

The ServiceRequestDeferred can be used when a service request is not immediately accepted. In a service seeker, if an ASP in a ServiceRequestSent status receives a P2P provision discovery response of which status is configured by 1, the ASP changes to a ServiceRequestDeferred status and may be able to transmit an event indicating the ServiceRequestDeferred status. And, in a service advertiser, if an ASP is in a ServiceRequestReceived status and auto_accept is set to FALSE in a corresponding AdvertiseService method, the ASP changes to the ServiceRequestDeferred status and may be able to transmit an event indicating the ServiceRequestDeferred status. If a remote device is waiting for a user input, long delay may occur between the present event and a following ConnectStatus (ServiceRequestAccepted) event or between the present event and a ConnectStatus (ServiceRequestFailed) event. A receiving side of the present event should implement timeout.

The ServiceRequestAccepted indicates that a service request is accepted. In a service seeker, if an ASP in a ServiceRequestSent status receives a P2P provision discovery response of which status is configured by 0 and Connection capability is successfully exchnaged, the ASP changes to a ServiceRequestAccepted status and may be able to transmit an event indicating the ServiceRequestAccepted status. In a service seeker, if an ASP in a ServiceRequestDeffered status receives a P2P provision discovery response of which status is configured by 0, the ASP changes to a ServiceRequestAccepted status and may be able to transmit an event indicating the ServiceRequestAccepted status. In a service advertiser, if an ASP in a ServiceRequestDeffered status receives a ConfirmSession method of which confirmed is set to TRUE, the ASP changes to a ServiceRequestAccepted status and may be able to transmit an event indicating the ServiceRequestAccepted status.

The ServiceRequestFailed is used in the following cases. In a service seeker, if an ASP in a ServiceRequestDeffered status is unable to receive a P2P provision discovery request for more than a prescribed time or the ASP is unable to configure valid connection capability based on a received P2P provision discovery request, the ASP changes to a ServiceRequestFailed status and may be able to transmit an event indicating the ServiceRequestFailed status. In a service advertiser, if an ASP in a ServiceRequestReceived status is unable to configure valid connection capability based on a received P2P provision discovery request and auto_accept is set to FALSE in a corresponding AdvertiService method, the ASP changes to a ServiceRequestFailed status and may be able to transmit an event indicating the ServiceRequestFailed status. In a service advertiser, if an ASP in a ServiceRequestDeffered status receives a ConfirmSession method of which confirmed is set to FALSE, the ASP changes to a ServiceRequestFailed status and may be able to transmit an event indicating the ServiceRequestFailed status. A service is able to call a CloseSession method after the aforementioned event is received.

The GroupFormationStarted indicates that P2P group formation is started. In a service seeker, if an ASP is in a ServiceRequestAccepted status, the ASP changes to a GroupFormationStarted status and may be able to transmit an event indicating the GroupFormationStarted status. In a service advertiser, if an ASP is in a ServiceRequestAccepted status and there is no IP connection with an intended peer ASP, the ASP changes to a GroupFormationStarted status and may be able to transmit an event indicating the GroupFormationStarted status.

The GroupFormationComplete indicates that a P2P group is successfully formed or a P2P group is already formed (i.e., existence of an IP connection).

The GroupFormationFailed indicates that P2P group formation is failed.

Figure 22:
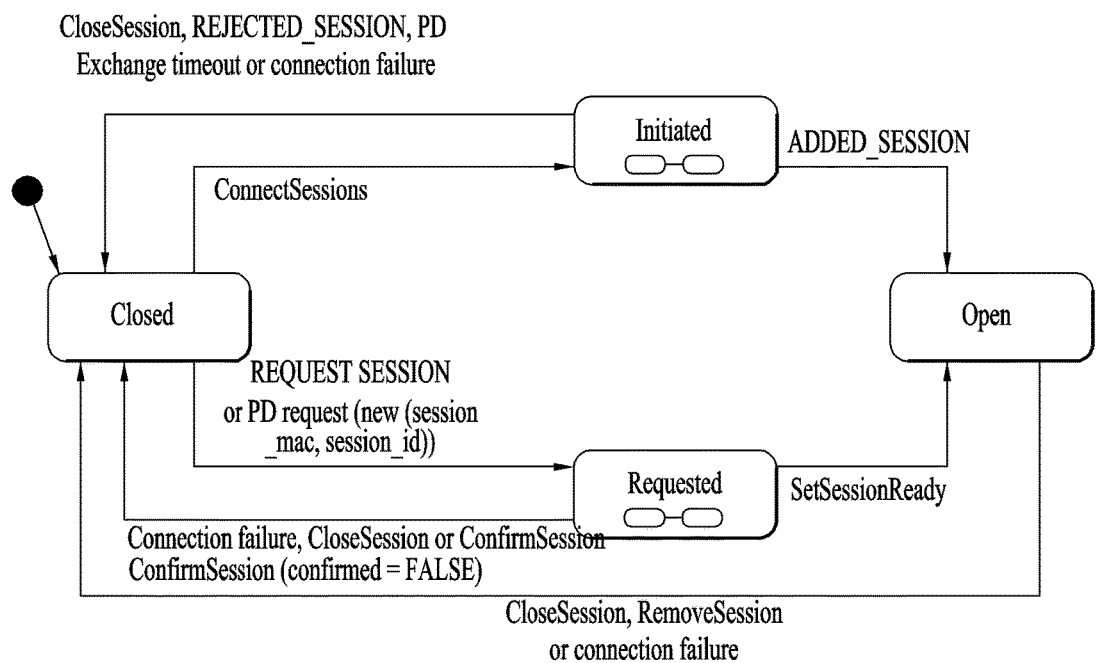
FIG. 22 is a diagram illustrating a state machine for an ASP-session according to the present invention.

FIG. 22 is a diagram illustrating a state machine for an ASP-session according to the present invention.

All WFDS devices may have a state machine for each ASP-session. FIG. 22 shows an example of a state machine for a single ASP-session.

If an ASP receives a ConnectionSession method from a service, the ASP can generate a new ASP-session (configured as an initiated status) as a service seeker. The initiated status can be configured by a plurality of sub-states. A sub-state machine for the service seeker is described later with reference to FIG. 23. In the initiated status, if the ASP receives an ADD_SESSION message for the ASP-session from a peer ASP, an ASP-session status is changed to an Open status. If the ASP receives a CloseSession method from a service, if the ASP receives a REJECTED_SESSION message from the peer ASP, if a P2P exchange timeout (or PD (provision discovery) exchange timeout) event occurs, if connection capability exchange failure occurs, or if a different connection failure event occurs, the ASP-session status is changed to a Close status from the initiated status.

If an ASP receives a P2P PD (provision discovery) request for a new pair of session_mac and session_id or receives a REQUEST_SESSION message, the ASP can generate a new ASP-session (configured as a Requested status) as a service advertiser. The Requested status can be configured by a plurality of sub-states. A sub-state machine for a service advertiser is described later with reference to FIG. 24. If the ASP receives a SetSessionReady method from a service, the ASP-session status is changed to an Open status from the Requested status. If an ASP in the Requested status receives a CloseSession method or a ConfirmSession (confirmed=FALSE) method or if a different connection failure event occurs, the ASP-session status is changed to a Closed status.

For both a service advertiser and a service seeker, if an ASP in the Open status receives a CloseSession method from a service, if the ASP receives a REMOVED_SESSION message from a peer ASP or if a different connection failure event occurs, the ASP-session status is changed to a Closed status.

Figure 23:
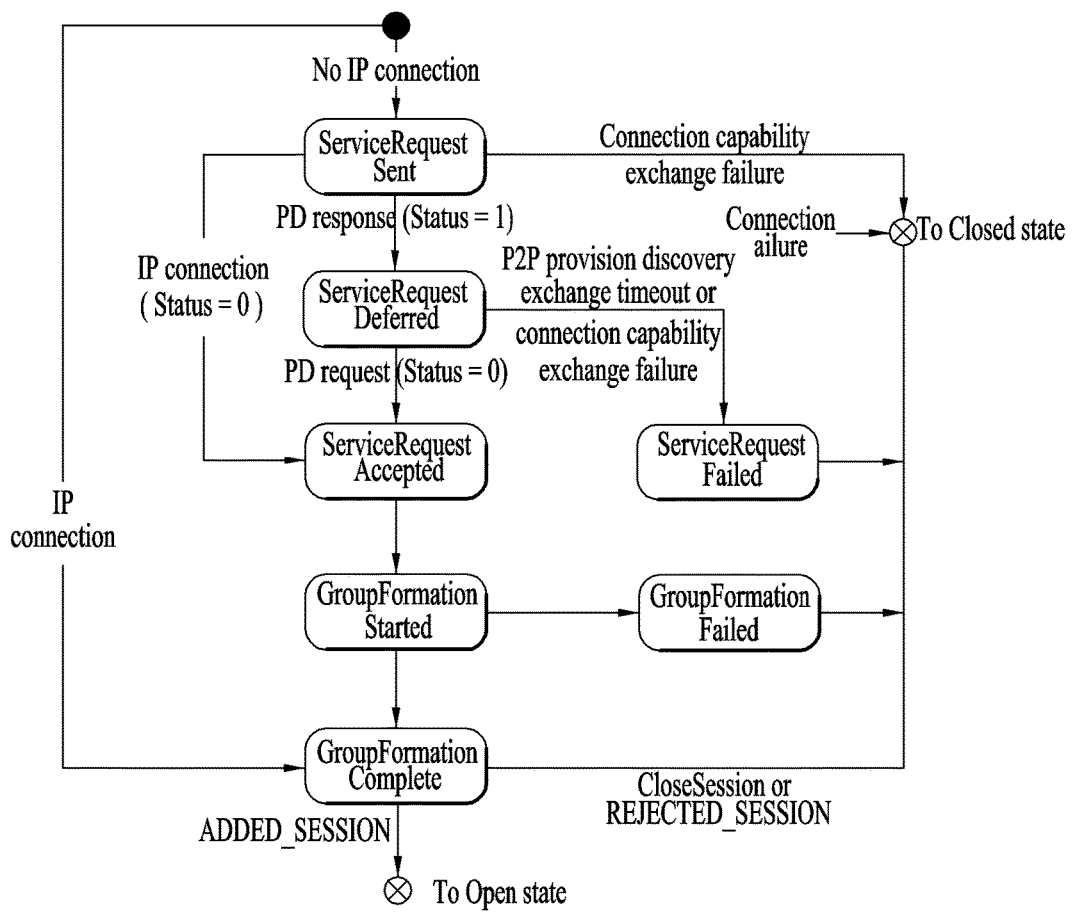
FIG. 23 is a diagram illustrating a sub-state machine for a service seeker.

FIG. 23 is a diagram illustrating a sub-state machine for a service seeker.

A state machine in FIG. 23 indicates a state machine for a service seeker in an Initiated state.

If IP connection with a peer device exists in an Entry state, it may be able to change to a GroupFormationComplete state. If the IP connection with the peer device does not exist in the Entry state, a PD (provision discovery) request is transmitted to a peer ASP and it may be able to change to a ServiceRequestSent state.

When an ASP receives a P2P PD response of which Status is set to 0 from the peer ASP in the ServiceRequestSent state, if connection capability of the P2P PD response received from the peer ASP is valid, it may be able to change to a ServiceRequestAccepted state. If the connection capability of the P2P PD response received from the peer ASP is invalid, it may be able to change to a Closed state. If the ASP receives a P2P PD response of which Status is set to 1 from the peer ASP in the ServiceRequestSent state, it may be able to change to a ServiceRequestDeferred state.

If the ASP receives a P2P PD request of which Status is set to 0 from the peer ASP in the ServiceRequestDeferred state, the ASP transmit a P2P PD response to the peer ASP. If the ASP is unable to configure valid connection capability for the P2P PD response, it may be able to change to a ServiceRequestFailed state. If the ASP is able to configure valid connection capability for the P2P PD response, it may be able to change to a ServiceRequestAccept state. If the ASP is unable to receive a PD request within a prescribed time in the ServiceRequestDeferred state, it may be able to change to the ServiceRequestFailed state.

It may be able to change to a Closed state from the ServiceRequestFailed state.

It may be able to change to a GroupFormationStarted state from the ServiceRequestAccepted state.

The GroupFormationStarted state can be changed to a GroupFormationFailed state when a P2P GO negotiation process is failed, autonomous GO generation is failed, joining to a previously existed P2P group is failed or a different reason occurs. If P2P group formation is successful, the GroupFormationStarted state is changed to a GroupFormationComplete state.

The GroupFormationFailed state is changed to a Closed state.

If an IP address is setup (in case of a new P2P group), if a UDP socket for an ASP coordination protocol is setup, if a REQUEST_SESSION message is sent to a service seeker, or if a service seeker receives an ADDED_SESSION message from a service advertiser, the GroupFormationComplete state is changed to an Open state. If a service seeker receives a REJECT_SESSION message from a service advertiser, the GroupFormationComplete state is changed to a Closed state. If a service seeker receives a CloseSession method from a service, the GroupFormationComplete state can be changed to the Closed state.

When other failure occurs, it may be changed to the Closed state.

Since no action is included in the ServiceRequestFailed state, the GroupFormationFailed state and the ServiceRequestAccepted state, the states may become the Closed state.

Figure 24:
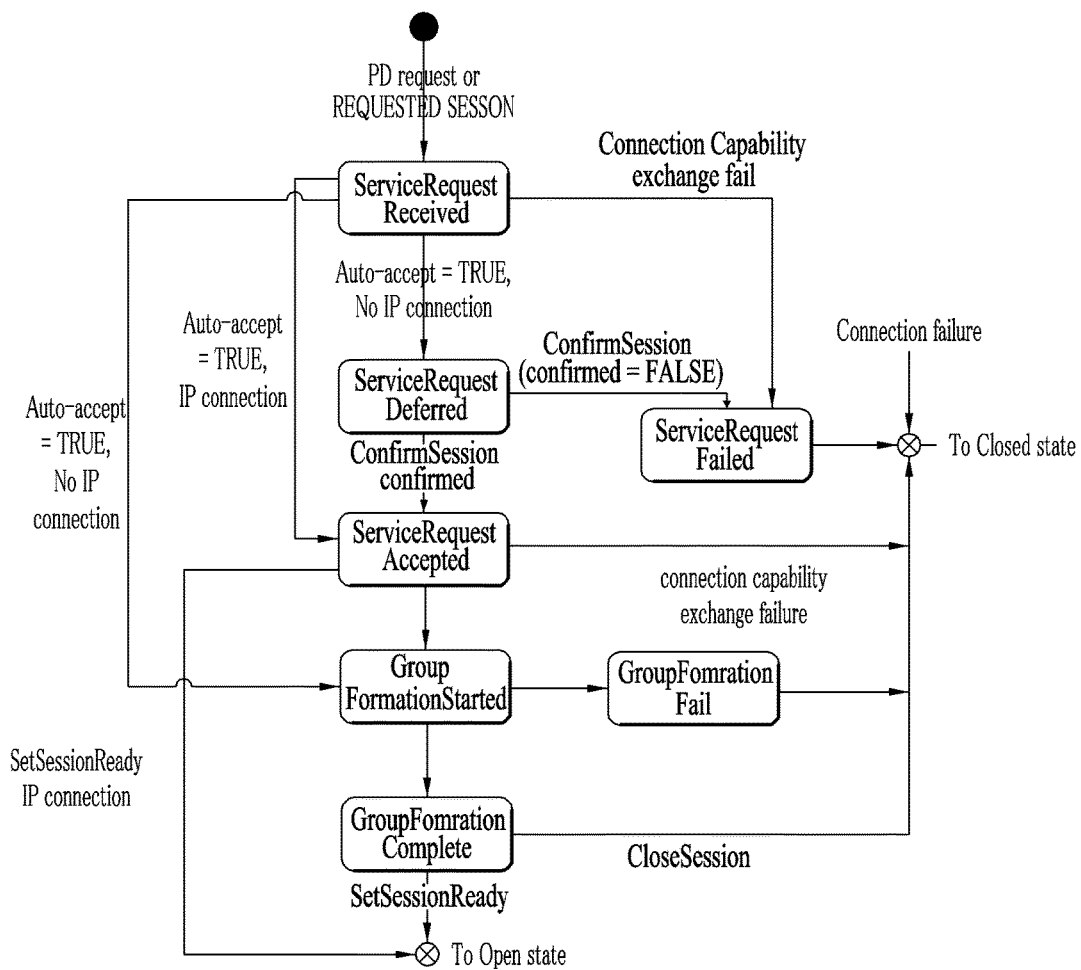
FIG. 24 is a diagram illustrating a sub-state machine for a service advertiser.

FIG. 24 is a diagram illustrating a sub-state machine for a service advertiser.

A state machine in FIG. 24 indicates a state machine for a service advertiser in a Requested state.

If an ASP receives a P2P PD request for a new pair of session_id and session_mac or if the ASP receives a REQUEST_SESISON message from a service seeker in an Entry state, an ASP-session may become a ServiceRequestReceived state.

In the ServiceRequestReceived state, if a service advertiser sets auto_accept to FALSE, a Session_Request event is transmitted to a service and the ServiceRequestReceived state is changed to a ServiceRequestDeferred state. In the ServiceRequestReceived state, if a service advertiser sets auto_accept to TRUE and there is no IP connection with a peer ASP, a P2P PD response is transmitted to the peer ASP. If the ASP is able to configure valid connection capability in response to the P2P PD response, the ServiceRequestReceived state is changed to a GroupFormationStarted state. If the ASP is unable to configure valid connection capability in response to the P2P PD response, the ServiceRequestReceived state is changed to a GroupFormationFailed state. In the ServiceRequestReceived state, if the service advertiser sets the auto_accept to TRUE and there exists IP connection with the peer ASP, the ServiceRequestReceived state is changed to a ServiceRequestAccepted state.

In a ServiceRequestDeffered state, if an ASP receives a Confirmation method of which confirmed is set to FALSE from a service, the ServiceRequestDeffered state is changed to a ServiceRequestFailed state. If the ASP receives a Confirmation method of which confirmed is set to TRUE, the ServiceRequestDeffered state is changed to a ServiceRequestAccepted state.

The ServiceRequestFailed state is changed to a Closed state.

In the ServiceRequestAccepted state, if IP connection with a peer device does not exists (i.e., a service request is initiated by P2P PD exchange), a P2P PD request message of which status is set to 0 is transmitted to the peer ASP. If the ASP receives connection capability, which is valid in a P2P PD response, from the peer ASP, the ServiceRequestAccepted state is changed to a GroupFormationStarted state. If the ASP receives connection capability, which is invalid in the P2P PD response, from the peer ASP, the ServiceRequestAccepted state is changed to a Closed state. In the ServiceRequestAccepted state, when IP connection with a peer device exists (i.e., if a service request is initiated by a REQUEST_SESSION message), if the ASP receives a SetSessionReady method from a service, the ServiceRequestAccepted state is changed to an Open state. In the ServiceRequestAccepted state, if the ASP receives a CloseSession method from the service, the ServiceRequestAccepted state is changed to the Closed state.

The GroupFormationStarted state can be changed to a GroupFormationFailed state when a P2P GO negotiation process is failed, autonomous GO generation is failed, joining to a previously existed P2P group is failed or a different reason occurs. If P2P group formation is successful, the GroupFormationStarted state is changed to a GroupFormationComplete state.

The GroupFormationFailed state is changed to a Closed state.

If an IP address is setup (in case of a new P2P group), if a UDP socket for an ASP coordination protocol is setup or if an ASP receives SetSessionReady from a service, the GroupFormationComplete state is changed to an Open state. Or, if the ASP receives a CloseSession method, the GroupFormationComplete state can be changed to a Closed state.

When other failure occurs, the GroupFormationComplete state is changed to the Closed state.

Since no action is included in the ServiceRequestFailed state and the GroupFormationFailed state, the states may become the Closed state.

Although the exemplary method of the present invention mentioned earlier in FIG. 13 to FIG. 24 is represented as a series of actions for clarity, an order of performing the steps of the present invention may be non-limited by the series of actions. If necessary, each of the steps can be performed at the same time or can be performed by an order different from each other. And, it is not mandatory to have all steps shown in the drawings to implement the method proposes by the present invention.

Moreover, each of items mentioned earlier in various embodiments of the present invention can be independently applied or two or more embodiments can be applied at the same time.

Figure 25:
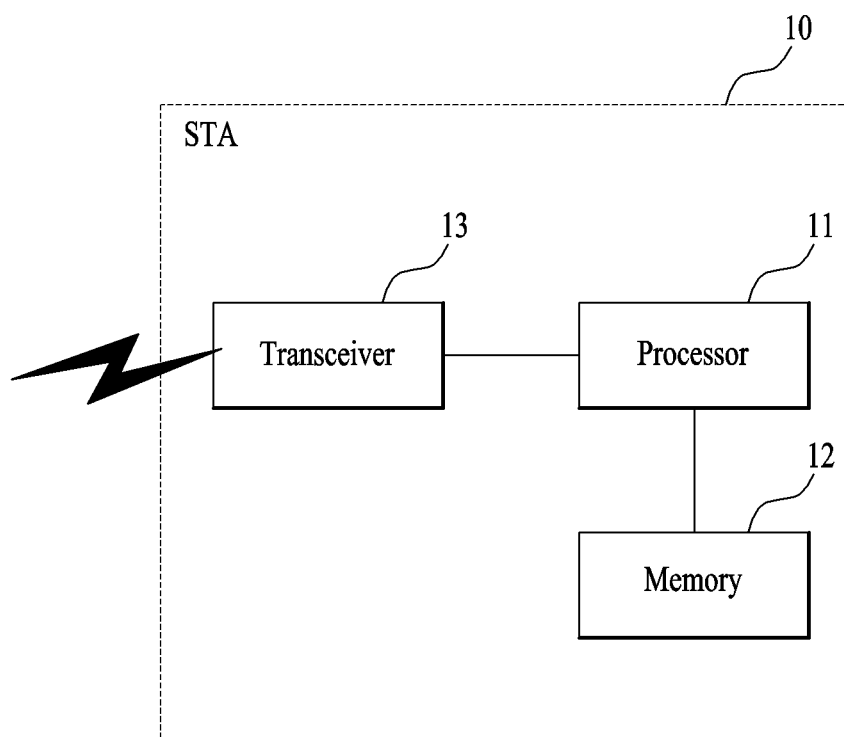
FIG. 25 is a block diagram for a configuration of a wireless device according one embodiment of the present invention.

FIG. 25 is a block diagram for a configuration of a wireless device according one embodiment of the present invention.

A wireless device 10 can include a processor 11, a memory 12 and a transceiver 13. The transceiver 13 can transmit and receive a radio signal. For instance, the transceiver can implement a physical layer according to IEEE 802 system. The processor 11 can implement a physical layer and/or a MAC layer according to IEEE 802 system in a manner of being connected with the transceiver 13. The processor 11 can be configured to perform one or more operations among an application, a service and an ASP layer according to the aforementioned various embodiments of the present invention. And, a module configured to implement an operation of a wireless device according to the aforementioned various embodiments of the present invention is stored in the memory 12 and the module can also be executed by the processor 11. The memory 12 is included in the internal of the processor 11 or is installed in the external of the processor 11 and can be connected with the processor 11 by a medium well-known to the public.

The wireless device 10 shown in FIG. 25 can be configured to support a Wi-Fi Direct service and perform a session setup. The processor 11 can be configured to setup P2P (peer-to-peer) connection between a first wireless device and a second wireless device including a provision discovery process between the first wireless device and the second wireless device to create a session for a first service. In order to create a session for a second service, the processor 11 can be configured to control the transceiver to transmit a session request (REQUEST_SESSION) message to the second wireless device from the first wireless device (if the wireless device corresponds to the second wireless device, the processor 11 can be configured to control the transceiver to receive a session request (REQUEST_SESSION) message). Session information on the second service can be included in the session request message.

A detail configuration of the wireless device 10 shown in FIG. 25 can be implemented in a manner of independently applying the items mentioned earlier in the various embodiments of the present invention or applying two or more embodiments at the same time. For clarity, explanation on overlapped contents is omitted at this time.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although the aforementioned various embodiments of the present invention are described centering on examples applied to IEEE 802.11 system, it may be applicable to various kinds of mobile communication systems using an identical scheme.

What is claimed is:

1. A method of establishing a session in a first wireless device supporting a Wi-Fi Direct service, the method comprising:
    transmitting a provision discovery request message, by the first wireless device, to a second wireless device;
    receiving a provision discovery response message in response to the provision discovery request message, by the first wireless device, from the second wireless device;
    establishing a connection between the first wireless device and a second wireless device to create a first session for a first service,
    wherein a P2P group formation is established and an ASP (application service platform) of the first wireless device is changed to a GroupFormationComplete state when the connection is established; and
    transmitting a session request (REQUEST_SESSION) message, by the first wireless device, to the second wireless device to create a second session for a second service,
    wherein the second session is created using the established connection and the established P2P group formation for the first session,
    wherein session information on the second service is included in the session request message,
    wherein when the ASP of the first wireless device receives a ConnectSession method from a service layer of the first wireless device, the ASP creates a new ASP-session as a service seeker and changes to an Initiate state, and
    wherein when a session addition (ADDED_SESSION) message is received from the second wireless device in response to the session request (REQUEST_SESSION) message, the ASP of the first wireless device changes the Initiate state to an Open state.

2. The method of claim 1, wherein the provision discovery request message and the provision discovery response message related to the second session for the second service are not exchanged between the first wireless device and the second wireless device when the connection between the first wireless device and the second wireless device is established.

3. The method of claim 1, wherein session information on the first service is contained in the provision discovery request message.

4. The method of claim 1, wherein at least one of a device discovery process and a service discovery process is performed before the connection is setup.

5. The method of claim 4, wherein a device discovery process comprises a probe request frame transmitted to the second wireless device from the first wireless device and a probe response frame received from the second wireless device by the first wireless device and wherein at least one of the probe request frame and the probe response frame comprises at least one of a plurality of service names or a plurality of service hash values for the first service and the second service.

6. The method of claim 1, wherein if a session rejection (REJECTED_SESSION) message is received from the second wireless device in response to the session request (REQUESTED_SESSION) message, the ASP of the first wireless device is changed to a Closed state from the Initiate state.

7. The method of claim 1, wherein the first service corresponds to one of services configured to support a Send, a Play, a Display, a Print and a third party application.

8. The method of claim 1, wherein the first wireless device corresponds to a service seeker and wherein the second wireless device corresponds to a service advertiser.

9. The method of claim 1, wherein the connection between the first wireless device and the second wireless device corresponds to a P2P (peer-to-peer) connection or an IP (internet protocol) connection.

10. A method of establishing a session in a second wireless device supporting a Wi-Fi Direct service, the method comprising:
    receiving a provision discovery request message, by the second wireless device, from a first wireless device;
    transmitting a provision discovery response message in response to the provision discovery request message, by the second wireless device, to the first wireless device;
    establishing a connection between a first wireless device and the second wireless device to create a first session for a first service,
    wherein a P2P group formation is established and an ASP (application service platform) of the first wireless device is changed to a GroupFormationComplete state when the connection is established; and
    receiving a session request (REQUEST_SESSION) message, by the second wireless device, from the first wireless device to create a second session for a second service,
    wherein the second session is created using the established connection and the established P2P group formation for the first session,
    wherein session information on the second service is included in the session request message,
    wherein when the ASP of the second wireless device receives the session request (REQUEST_SESSION) message from the first wireless device, the ASP creates a new ASP-session as a service advertiser and changes to a Requested state, and
    wherein the ASP of the second wireless device changes the Requested state to an Open state based on the established connection between the first wireless device and the second wireless device.

11. A first wireless device supporting a Wi-Fi Direct service and performing session setup, comprising:

a transceiver; and
a processor configured to control the transceiver,
wherein the processor is further configured to:
control the transceiver to transmit a provision discovery request message to a second wireless device,
control the transceiver to receive a provision discovery response message in response to the provision discovery request message from the second wireless device,
establish a connection between the first wireless device and a second wireless device to create a first session for a first service,
wherein a P2P group formation is established and an ASP (application service platform) of the first wireless device is changed to a GroupFormationComplete state when the connection is established, and
control the transceiver to transmit a session request (REQUEST_SESSION) message to the second wireless device to create a second session for a second service using the existing connection,
wherein the second session is created using the established connection and the established P2P group formation for the first session,
wherein session information on the second service is included in the session request message,
wherein when the ASP of the first wireless device receives a ConnectSession method from a service layer of the first wireless device, the ASP creates a new ASP-session as a service seeker and changes to an Initiate state, and
wherein when a session addition (ADDED_SESSION) message is received from the second wireless device in response to the session request (REQUEST_SESSION) message, the ASP of the first wireless device changes the Initiate state to an Open state.

12. A second wireless device supporting a Wi-Fi Direct service and performing session setup, comprising:

a transceiver; and
a processor configured to control the transceiver,
wherein the processor is further configured to:
control the transceiver to receive a provision discovery request message from a first wireless device,
control the transceiver to transmit a provision discovery response message in response to the provision discovery request message to the first wireless device,
establish a connection between a first wireless device and the second wireless device to create a first session for a first service,
wherein a P2P group formation is established and an ASP (application service platform) of the first wireless device is changed to a GroupFormationComplete state when the connection is established, and
control the transceiver to receive a session request (REQUEST_SESSION) message from the first wireless device in the second wireless device to create a second session for a second service using the existing connection,
wherein the second session is created using the established connection and the established P2P group formation for the first session,
wherein session information on the second service is included in the session request message,
wherein when the ASP of the second wireless device receives the session request (REQUEST_SESSION) message from the first wireless device, the ASP creates a new ASP-session as a service advertiser and changes to a Requested state, and
wherein the ASP of the second wireless device changes the Requested state to an Open state based on the established connection between the first wireless device and the second wireless device.

* * * * *